United States Patent
Reid

(10) Patent No.: US 10,737,206 B2
(45) Date of Patent: *Aug. 11, 2020

(54) KEYED SYSTEM FOR CONNECTION OF FILTER CARTRIDGE TO FILTER HOLDER

(71) Applicant: Roger P. Reid, Caldwell, ID (US)

(72) Inventor: Roger P. Reid, Caldwell, ID (US)

(73) Assignee: OMNIPURE FILTER COMPANY, INC., Caldwell, ID (US)

( * ) Notice: Subject to any disclaimer, the term of this patent is extended or adjusted under 35 U.S.C. 154(b) by 1093 days.

This patent is subject to a terminal disclaimer.

(21) Appl. No.: 15/133,108

(22) Filed: Apr. 19, 2016

(65) Prior Publication Data

US 2017/0021294 A1    Jan. 26, 2017

Related U.S. Application Data

(63) Continuation of application No. 14/099,312, filed on Dec. 6, 2013, now Pat. No. 9,314,722, which is a
(Continued)

(51) Int. Cl.
*B01D 35/30* (2006.01)
*B01D 27/08* (2006.01)
(Continued)

(52) U.S. Cl.
CPC ........... *B01D 35/306* (2013.01); *B01D 27/08* (2013.01); *B01D 35/30* (2013.01);
(Continued)

(58) Field of Classification Search
CPC ...... B01D 35/306; B01D 27/08; B01D 35/30; B01D 46/0004; B01D 46/009;
(Continued)

(56) References Cited

U.S. PATENT DOCUMENTS

| D93,910 S | 11/1934 | Camp |
|---|---|---|
| 1,999,913 A | 4/1935 | Merritt |

(Continued)

FOREIGN PATENT DOCUMENTS

| AU | 752306 C | 2/2002 |
|---|---|---|
| DE | 19827297 A1 | 12/1999 |

(Continued)

OTHER PUBLICATIONS

English translation of application data for DE 199 25 297 C1.
(Continued)

*Primary Examiner* — Thomas M Lithgow
(74) *Attorney, Agent, or Firm* — Pederson & Company, PLLC; Ken J. Pederson; Barbara S. Pedersen

(57) ABSTRACT

A filter and its holder each have a keyed surface, one being a protruding "key" and one being a recessed "lock," wherein cooperation of these keyed surfaces is required in order for the filter to be installed in the holder. Modification/adaptation of the keyed surfaces, by changing the location, number and length of the key protrusions and cooperating recesses during manufacture, allows various sets of mating filters and holders to be produced so that only mating/matching filters and holders may be connected together. The keyed protrusions are preferably located on an upper shoulder or on protruding flange(s) of the upper end of the filter. The cooperating recess structure inside the filter holder comprises axial recesses that allow axial insertion of the key protrusions, and hence the filter, into the holder and also a circumferential recesses portion that receives multiple key protrusions to retain the filter in the holder. This way, multiple key protrusions slide into and are retained in a single circumferential recess/slot, rather than each key protrusion being received in its own separate circumferential recess/slot.

21 Claims, 15 Drawing Sheets

Related U.S. Application Data continuation-in-part of application No. 14/059,818, filed on Oct. 22, 2013, now Pat. No. 9,421,485, which is a continuation of application No. 12/353,198, filed on Jan. 13, 2009, now Pat. No. 8,562,830, which is a continuation of application No. 11/316,373, filed on Dec. 20, 2005, now Pat. No. 7,476,314, which is a continuation-in-part of application No. 10/786,655, filed on Feb. 24, 2004, now Pat. No. 6,977,006, which is a continuation of application No. 09/928,666, filed on Aug. 11, 2001, now Pat. No. 6,695,891, which is a continuation-in-part of application No. 11/200,864, filed on Aug. 9, 2005, now Pat. No. 7,172,693, which is a continuation of application No. 10/372,040, filed on Feb. 21, 2003, now Pat. No. 6,926,826, which is a continuation-in-part of application No. 12/861,240, filed on Aug. 23, 2010, now abandoned.

(60) Provisional application No. 60/272,221, filed on Feb. 27, 2001, provisional application No. 60/358,692, filed on Feb. 21, 2002, provisional application No. 61/235,693, filed on Aug. 21, 2009, provisional application No. 61/310,204, filed on Mar. 3, 2010, provisional application No. 60/224,632, filed on Aug. 11, 2000.

(51) Int. Cl.
*B01D 46/00* (2006.01)
*B01D 46/24* (2006.01)

(52) U.S. Cl.
CPC ....... *B01D 46/0004* (2013.01); *B01D 46/009* (2013.01); *B01D 46/2411* (2013.01); *B01D 46/2414* (2013.01); *B01D 2201/302* (2013.01); *B01D 2201/303* (2013.01); *B01D 2201/4015* (2013.01); *B01D 2201/4046* (2013.01); *B01D 2201/4053* (2013.01); *B01D 2201/4061* (2013.01); *B01D 2265/026* (2013.01); *Y10S 285/914* (2013.01)

(58) Field of Classification Search
CPC ........ B01D 46/2414; B01D 2201/4015; B01D 2201/4061; B01D 2201/303; B01D 2201/4053; B01D 2201/302; B01D 2201/4046; B01D 2265/026; Y10S 285/914
USPC .................................................. 210/232, 444
See application file for complete search history.

(56) References Cited

U.S. PATENT DOCUMENTS

| | | |
|---|---|---|
| 2,568,196 A | 9/1951 | Kennedy |
| 2,991,885 A | 7/1961 | Gutkowski |
| 3,107,601 A | 10/1963 | Longmire |
| 3,287,031 A | 11/1966 | Simmons |
| 3,397,135 A | 8/1968 | Otto |
| 3,502,221 A * | 3/1970 | Butterfield ........... B01D 29/117 210/444 |
| 3,685,539 A | 8/1972 | Warren |
| 3,753,495 A | 8/1973 | Bjork |
| 3,950,251 A | 4/1976 | Hiller |
| 4,211,439 A | 7/1980 | Moldestad |
| 4,267,042 A | 5/1981 | Hoffmann |
| D288,348 S | 2/1987 | Maddock |
| 4,857,191 A | 8/1989 | Wolf |
| 4,877,521 A | 10/1989 | Petrucci et al. |
| 4,948,505 A | 8/1990 | Petrucci et al. |
| 4,956,086 A | 9/1990 | Thomsen et al. |
| 5,017,285 A | 5/1991 | Janik et al. |
| 5,035,797 A | 7/1991 | Janik |
| 5,092,999 A | 3/1992 | Valenzuela et al. |
| 5,108,598 A | 4/1992 | Posner |
| 5,114,572 A | 5/1992 | Hunter et al. |
| RE34,031 E | 8/1992 | Thomsen et al. |
| RE34,050 E | 9/1992 | Thomsen et al. |
| 5,186,829 A | 2/1993 | Janik |
| 5,236,579 A | 8/1993 | Janik et al. |
| 5,336,406 A * | 8/1994 | Stanford ............... B01D 35/153 210/235 |
| 5,342,518 A | 8/1994 | Posner et al. |
| D356,625 S | 3/1995 | Petrucci et al. |
| 5,397,462 A | 3/1995 | Higashijima et al. |
| 5,486,288 A | 1/1996 | Stanford et al. |
| 5,651,887 A | 7/1997 | Posner et al. |
| 5,766,463 A | 6/1998 | Janik et al. |
| 5,837,137 A | 11/1998 | Janik |
| 5,925,245 A | 7/1999 | Bradford et al. |
| D412,551 S | 8/1999 | Smith et al. |
| 6,001,249 A | 12/1999 | Bailey et al. |
| 6,048,455 A | 4/2000 | Janik |
| 6,068,770 A | 5/2000 | Niermeyer et al. |
| 6,080,313 A | 6/2000 | Kelada |
| 6,120,685 A | 9/2000 | Carlson et al. |
| 6,187,188 B1 | 2/2001 | Janik et al. |
| 6,277,277 B1 | 8/2001 | Jacobi |
| 6,348,149 B1 | 2/2002 | Jenkins |
| 6,458,269 B1 | 10/2002 | Bassett et al. |
| 6,579,455 B1 | 6/2003 | Muzik et al. |
| 6,649,056 B2 | 11/2003 | Fritze |
| 6,695,891 B2 * | 2/2004 | Reid ...................... B01D 35/30 210/252 |
| 6,776,906 B2 | 8/2004 | Reid |
| 6,843,912 B2 | 1/2005 | Chaney |
| 6,926,826 B2 | 8/2005 | Reid |
| 6,977,006 B2 * | 12/2005 | Reid ...................... B01D 35/30 210/252 |
| 7,138,052 B2 | 11/2006 | Reid |
| 7,172,693 B2 | 2/2007 | Reid |
| 7,186,337 B2 | 3/2007 | Reid |
| D548,307 S | 8/2007 | Reynolds et al. |
| D570,951 S | 6/2008 | Morita et al. |
| 7,413,668 B2 | 8/2008 | Reid |
| 7,476,314 B2 | 1/2009 | Reid |
| 7,476,315 B2 | 1/2009 | Reid |
| D599,880 S | 9/2009 | Rampen et al. |
| D614,257 S | 4/2010 | Kojima |
| D638,516 S | 5/2011 | Greenway-Balnar et al. |
| D646,751 S | 10/2011 | Salvador et al. |
| D655,781 S | 3/2012 | Salvador et al. |
| D656,578 S | 3/2012 | Sherman et al. |
| D656,579 S | 3/2012 | Sherman et al. |
| 8,167,966 B2 | 5/2012 | Amirkhanian et al. |
| D679,779 S | 4/2013 | Reid |
| 8,562,830 B2 * | 10/2013 | Reid ...................... B01D 35/30 210/232 |
| D712,007 S | 8/2014 | Reid |
| D717,395 S | 11/2014 | Neto |
| D735,294 S | 7/2015 | Reid |
| 9,314,722 B2 * | 4/2016 | Reid ...................... B01D 35/306 |
| 2004/0222145 A1 | 11/2004 | Onoue et al. |
| 2011/0203985 A1 | 8/2011 | Reid |
| 2014/0174999 A1 | 6/2014 | Reid |
| 2014/0175000 A1 | 6/2014 | Reid |

FOREIGN PATENT DOCUMENTS

| | | |
|---|---|---|
| DE | 19925297 C1 | 7/2000 |
| DE | 19960600 A1 | 6/2001 |
| EP | 0231862 A2 | 8/1987 |
| EP | 0269054 A2 | 6/1988 |
| EP | 0278771 A1 | 8/1988 |
| EP | 0580501 B1 | 1/1994 |
| EP | 0887100 A1 | 12/1998 |
| GB | 771968 A | 4/1957 |
| KR | 1999-0086940 A | 12/1999 |
| WO | 94/02407 A1 | 2/1994 |
| WO | 97/45362 A1 | 12/1997 |

(56) References Cited

FOREIGN PATENT DOCUMENTS

| WO | 01/64312 A1 | 9/2001 |
| WO | 01/80967 A1 | 11/2001 |
| WO | 01/83079 A1 | 11/2001 |
| WO | 02/13944 A2 | 2/2002 |
| WO | 03/031020 A1 | 4/2003 |
| WO | 03/072220 A1 | 9/2003 |
| WO | 2004/014519 A3 | 2/2004 |

OTHER PUBLICATIONS

PCT International Search Report for PCT/US01/25307, dated May 22, 2002, Applicant: Reid.
PCT International Preliminary Examination Report for PCT/US01/25307, dated Jun. 6, 2003, Applicant: Reid.

\* cited by examiner

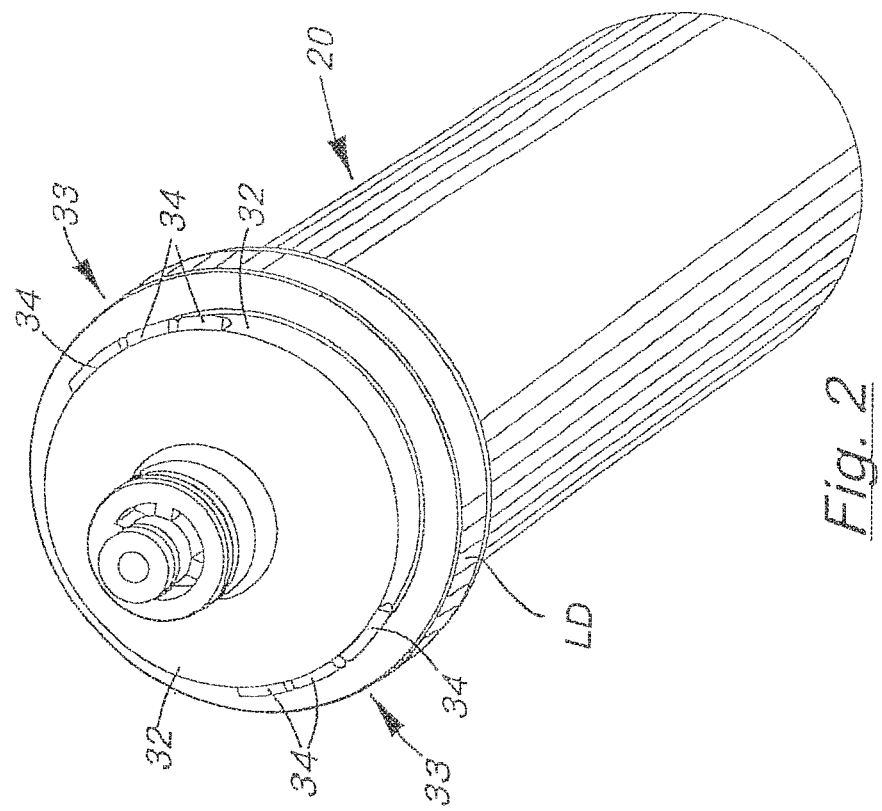
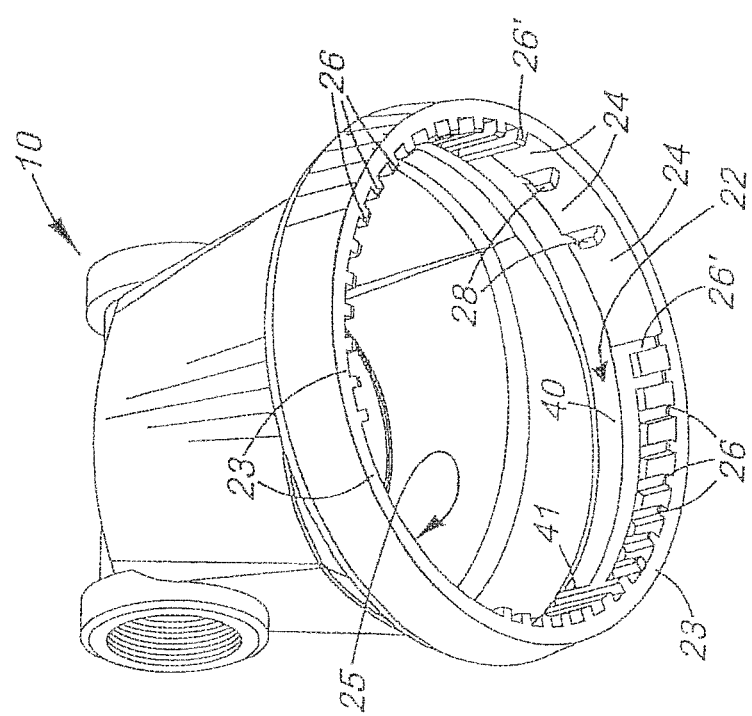

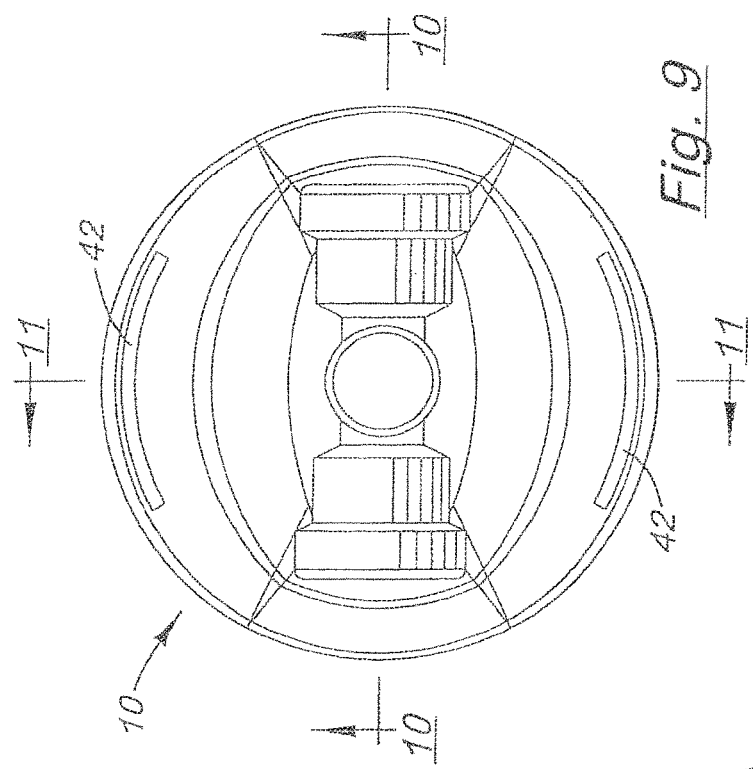
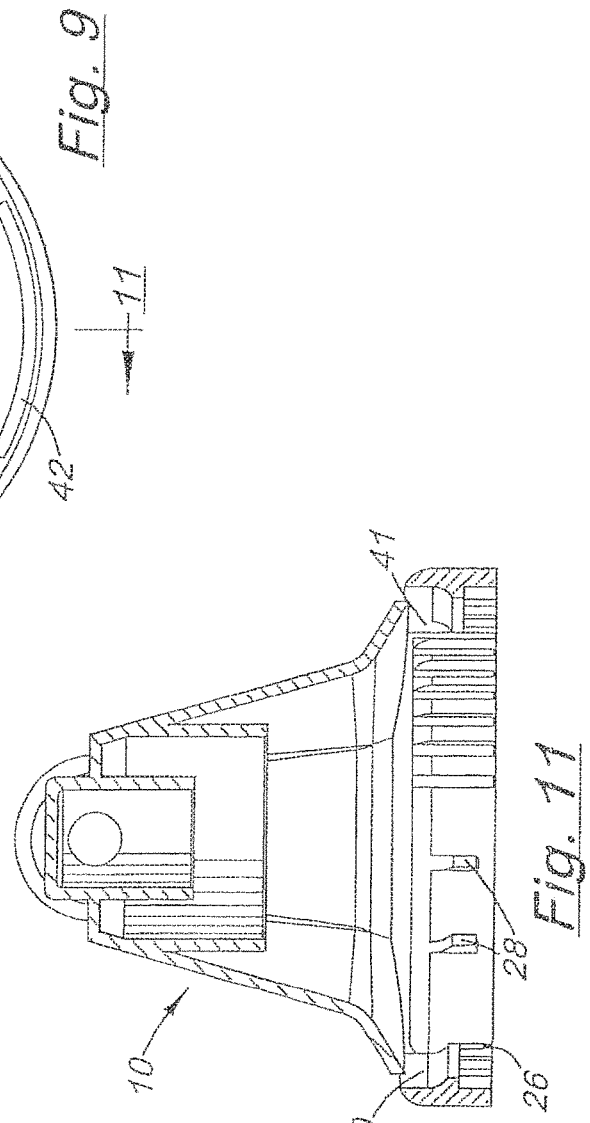
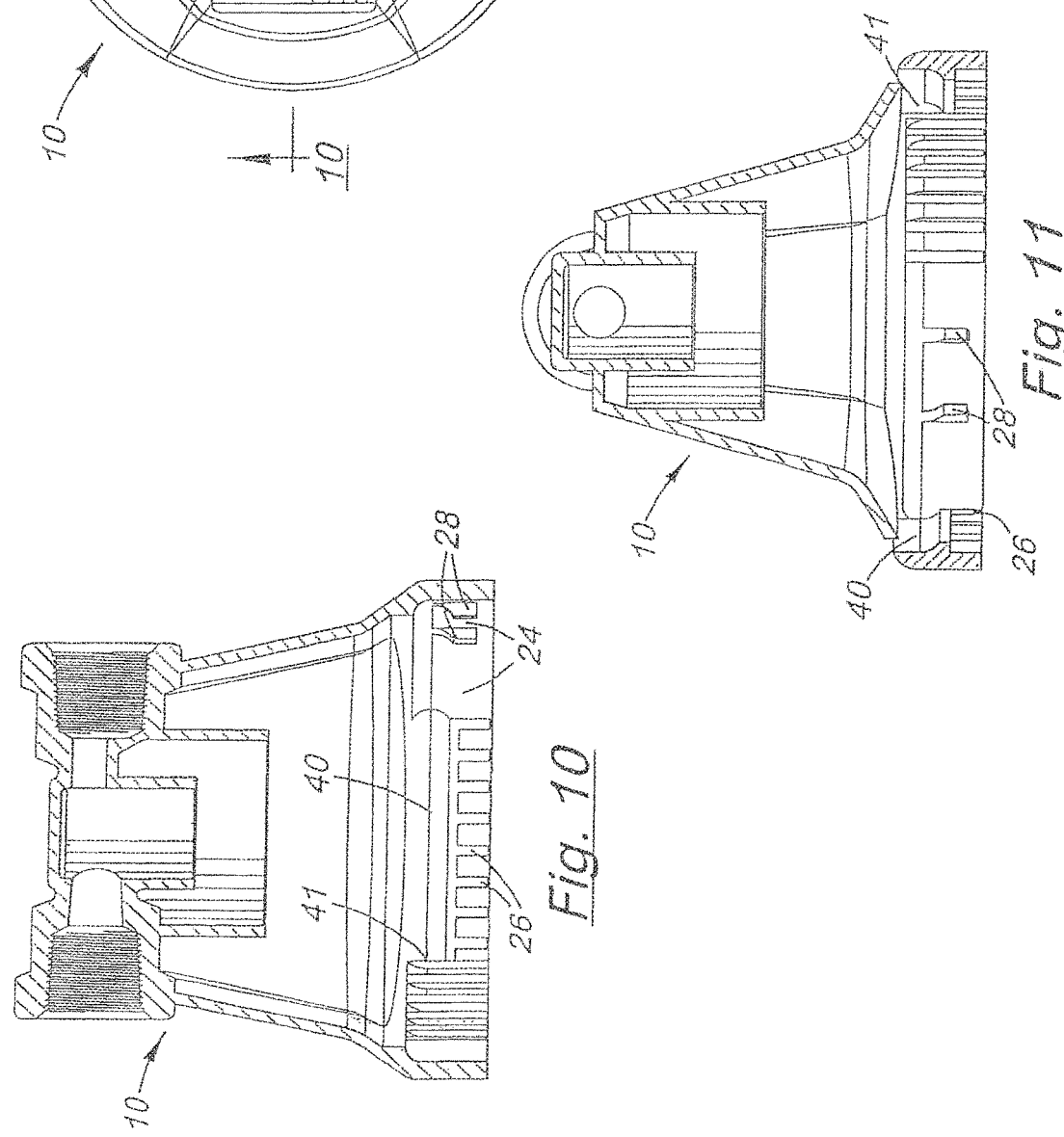

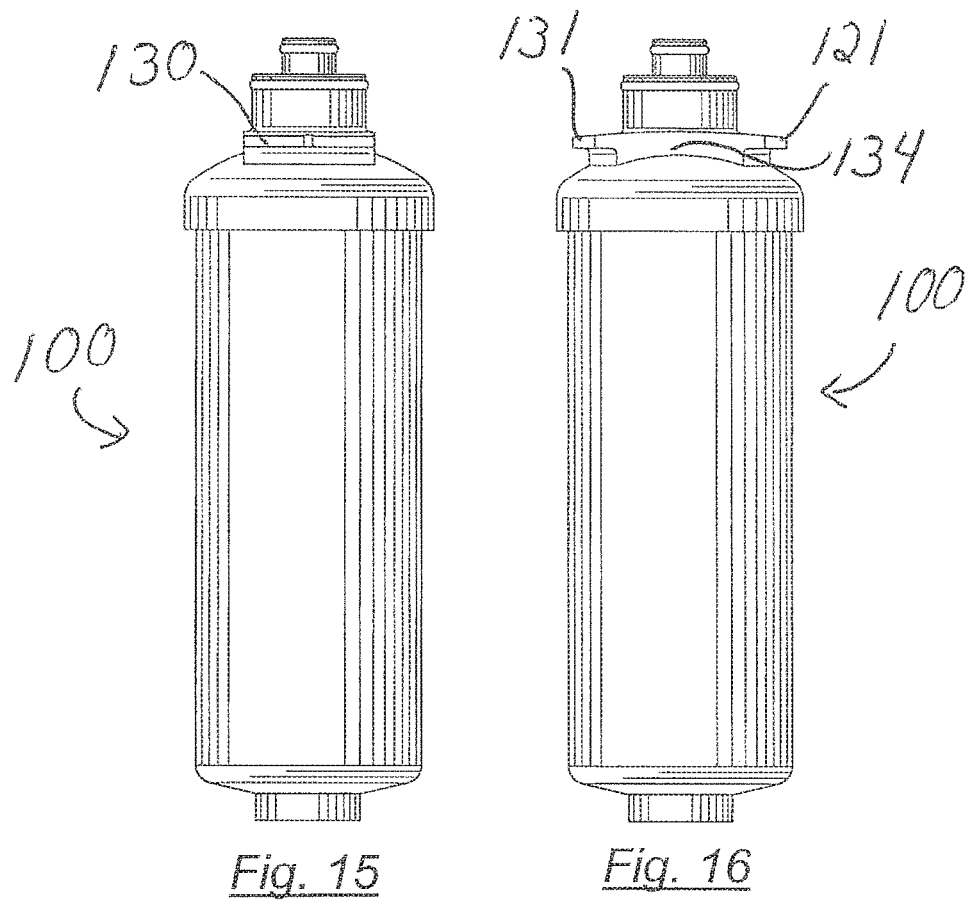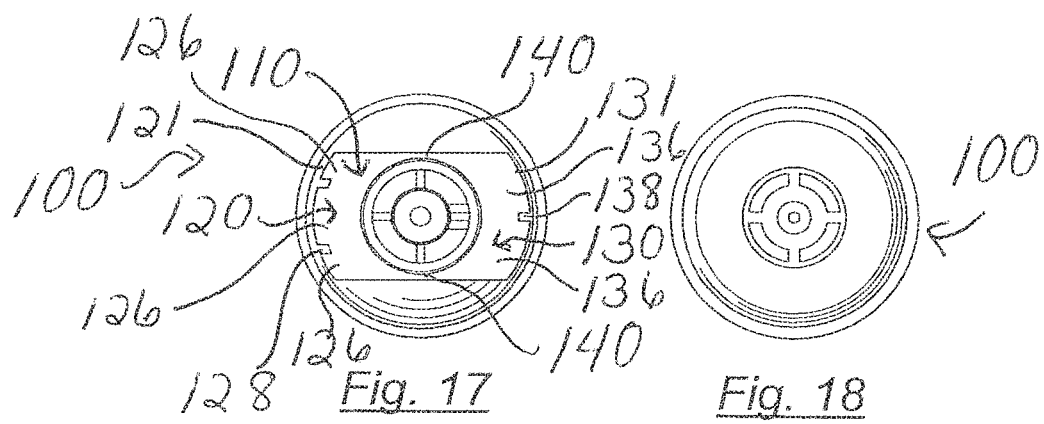

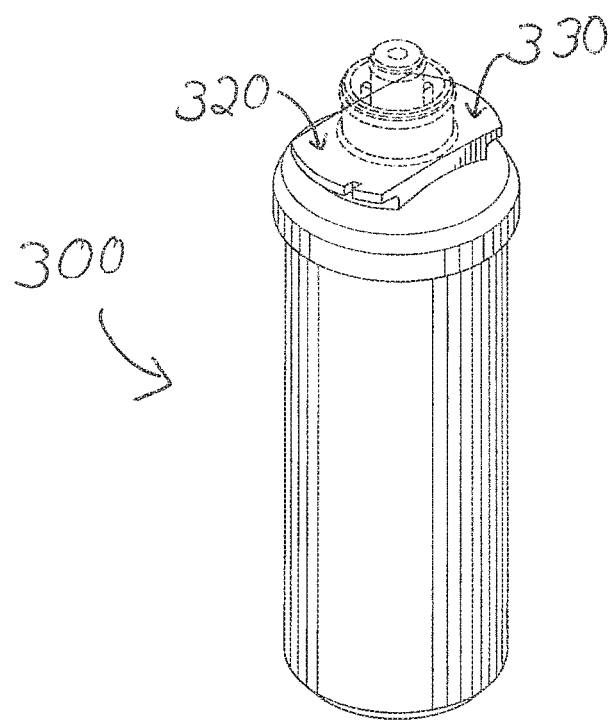
*Fig. 26*
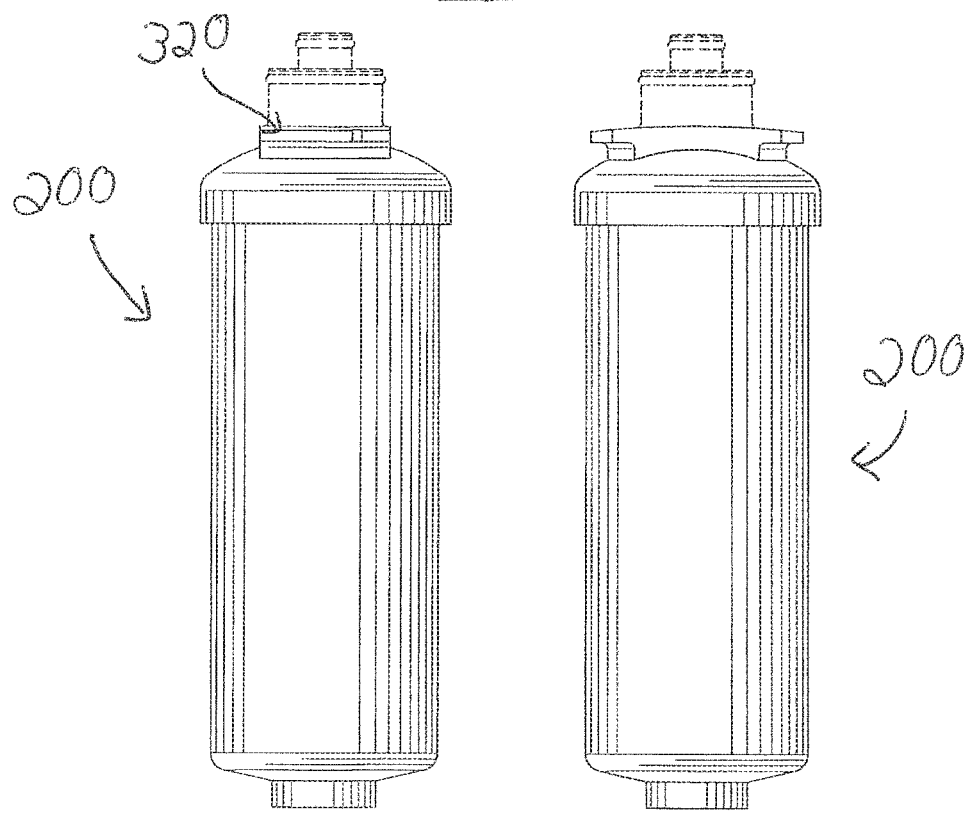
*Fig. 27*    *Fig. 28*

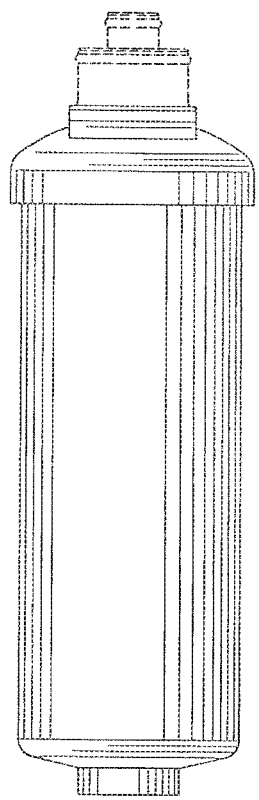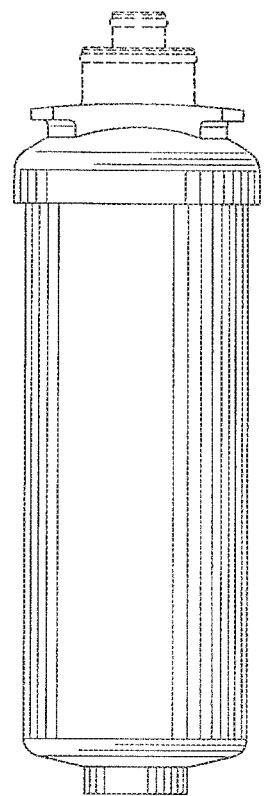
*Fig. 29*  *Fig. 30*
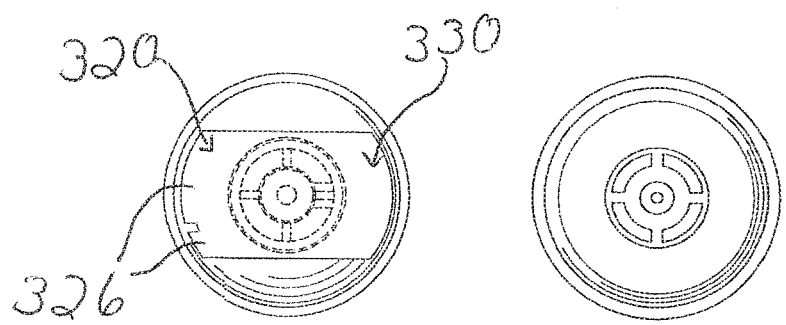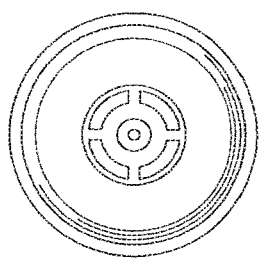
*Fig. 31*  *Fig. 32*

KEYED SYSTEM FOR CONNECTION OF FILTER CARTRIDGE TO FILTER HOLDER

This application is a continuation of Non-Provisional application Ser. No. 14/099,312, filed Dec. 6, 2013, and issuing as U.S. Pat. No. 9,314,722 on Apr. 19, 2016, which is a continuation-in-part of pending application Non-Provisional application Ser. No. 14/059,818, filed Oct. 22, 2013, which is a continuation of prior application Ser. No. 12/353,198, filed Jan. 13, 2009 and issuing on Oct. 22, 2013 at U.S. Pat. No. 8,562,830, which is a continuation of prior application Ser. No. 11/316,373, entitled "Keyed System For Connection of Filter Cartridge to Filter Holder", filed on Dec. 20, 2005 and issuing on Jan. 13, 2009 as U.S. Pat. No. 7,476,314, which is a continuation-in-part of patent application Ser. No. 10/786,655, filed Feb. 24, 2004, and issued on Dec. 20, 2005 as U.S. Pat. No. 6,977,006, which is a continuation of patent application Ser. No. 09/928,666, filed Aug. 11, 2001, and issued on Feb. 24, 2004 as U.S. Pat. No. 6,695,891, which is a non-provisional application claiming priority of provisional patent application Ser. No. 60/224,632, filed Aug. 11, 2000, and also claiming priority of prior, provisional patent application Ser. No. 60/272,221, filed Feb. 27, 2001, which are herein incorporated by this reference. Application Ser. No. 11/316,373, filed Dec. 20, 2005, is also a continuation-in-part of, and claims priority of, patent application Ser. No. 11/200,864, filed on Aug. 9, 2005, issued on Feb. 6, 2007 as U.S. Pat. No. 7,172,693 which is a continuation of patent application Ser. No. 10/372,040, filed Feb. 21, 2003, and issued as U.S. Pat. No. 6,926,826 on Aug. 9, 2005, which claims priority of provisional application 60/358,692, filed Feb. 21, 2002. This application is also a continuation-in-part of Non-Provisional application Ser. No. 12/861,240, filed Aug. 23, 2010, which claims benefit of Provisional Application Ser. No. 61/235,693, filed Aug. 21, 2009, and also of Provisional Application Ser. No. 61/310,204, filed Mar. 3, 2010, the entire disclosures of which are incorporated herein by this reference.

BACKGROUND OF THE INVENTION

Field of the Invention

This invention relates generally to fluid filters and filters and connections for the filters/cartridges to piping, valving, brackets, and other holders that cooperate with the filters/cartridges to make them operative in a flowing fluid system. More specifically, this invention relates to a system for "keying" a particular filter or filter cartridge to a particular cooperating filter head member or filter valve head.

SUMMARY OF THE INVENTION

The invention is an apparatus and/or method wherein a portion of a fluid filter-holder connection is structurally adapted so that only matched filters and holders can cooperate to allow installation of the filter in the holder and/or to form a fluid seal. In other words, each filter and holder combination or "set" is "keyed" so that only that particular filter design mates with that holder. According to the invention, there are created various filter and holder sets (also "filter-holder sets") that each have the adaptation, but the adaptation is slightly shifted in location and/or different in number, shape, style, or size of adaptation elements, or otherwise offset for each set compared to the other sets. This way, a filter from one set may not be mixed with a filter from another set, and, therefore, a filter may not be installed on any but its own matching holder.

The adaptation preferably involves varying location, number, shape, style, and/or size of "key" and "lock" (protrusion(s) and recess(es), respectively) for different sets of cooperating filters and holders. For example, mating protrusion(s) and recess(es) may be at a certain location on a circumference for one filter-holder set, while a mating protrusion(s) and recess(s) of a similar or identical shape may be at a different location on the circumference for another filter-holder set, and so on, for each similarly-shaped-but-differently-located-adaptation filter and holder set. Thus, in other words, the protrusion structure and the recess structure may be selectably locateable around cooperating perimeters of a filter and its holder. In addition or instead, the number, shape, style, and/or size of protrusions and recesses may be different for various filter-holder sets, so that only purposely-mating, "matched sets" of filters and holders may be connected together and successfully used. The protrusion and recess structures are preferably rigidly molded or otherwise permanently placed on/in the filter and holder, and so they are not considered moveable or adjustable during use. They are, however, easily changed in the molding or other manufacturing process, that is, they are easily selectable by choosing the location, number, shape, style, and/or size prior to/during manufacture.

This system may include a plurality of sets of filters and holders, each set having a differently-located, differently-numbered, differently-shaped, differently-styled, and/or differently-sized key and lock, wherein the key and lock of each set cooperate with each other to allow that filter to be installed in that holder, but that filter may not be installed in any other holder because the key or lock of that filter does not cooperate with the key or lock of the other holder. The term "key or lock" is used because the protrusions may be placed on either the filter or the holder, and the recess may therefore be placed on the other item.

Such a system allows, for example, a water or beverage filtration facility, experimental pilot plant, or other filter user may control filter placement accurately. A facility with multiple, different filtering applications may have filters on hand for each of the applications, but the filters will not be confused. For example, in a facility in which there are two different applications, many of the two different types of filters may be kept in stock and even may be mixed during storage or handling, but the filters will not be mixed when installed into the filter holders. This is because the filter holder and the filters for the first application are "keyed" differently than the filter holder and the filters for the second application. The terms "keying" or "keyed" refer generally to how and where the entire key system is located and accomplished, that is, to the positioning, style, shape, size and/or number of either one or both of the cooperating key and lock structures, rather than specifically to only the location of the "key protrusion." All the filters for the first application are keyed the same, that is, to match the first application holder, and all the filters for the second application are keyed the same, to match the second application holder. The keying for the first application and the keying for the second application does not need to be very different, but may be merely, for example, a slightly different angular position for the two protrusions and recesses and/or slightly different circumferential lengths for multiple key protrusions within a single protrusion structure (that is, different lengths for the portions of the subdivided protrusion structure).

Also, a filter manufacturer may control his product lines more carefully by using the invented key system. A manufacturer may key his holders and filters differently for different countries, different clients, different distributors, or for different time periods. This technique may be used to prevent unauthorized or low-quality copies of the manufacturer's filters from easily being made. With so many differently-keyed filters in the marketplace provided by the original manufacturer, the incentive to provide cheap, low quality copies will be minimized, due to the expense of retooling for each "key and lock" set.

The key system may include many different protrusion and recess structures, for example, tabs and slots (typically thin or elongated bar and channel structures or elongated dove-tail structures), bumps and holes (typically rounded or mounded structures with cooperating valleys or holes), wedges and wedge-shaped wells (typically circular section structures); protruding shoulders, plates, flanges, or wings with notches or cutouts to form multiple key protrusions in a single protrusion structure; and many other shapes. If a filter must be rotated on its longitudinal axis to be installed in a holder, leeway in the recess structure is supplied so that the protrusion may enter the recess structure while the filter still has a circumferential distance to turn. For example, in the case of an elongated filter that is pushed up into a filter head and then rotated on its axis to install its top end into a filter head, the recess comprises an axial portion for allowing axial insertion and a radial/circumferential portion for rotation of the filter on its longitudinal axis relative to the filter head.

The key system structures are located on surfaces of filters (or filters cartridges) and holders that contact each other during connection of the filter to the holder. This may be either surfaces that are involved in mainly providing a physical connection between the filter and holder or that also are involved in providing a fluid connection between the filter and the holder.

In preferred embodiments, protrusion structure extends radially out from a portion of the upper end of the filter housing, wherein said portion is received inside the cavity of the holder. The preferred embodiments of protrusion structure extend radially outward from the top end of the filter housing on a shoulder, shelf, plate, flange or other filter surface/perimeter, provided on or near the radial upper wall of the filter housing. The outer extremity of the protrusions on said shoulder, shelf, plate or flange preferably reach near to, but preferably not past, the largest diameter of the filter housing. For example, the protrusions may be provided on a circular/cylindrical intermediate shoulder that is coaxial with the central longitudinal axis of the filter and intermediate in diameter between the largest-diameter shoulder and the central neck of the filter housing. Or, for example, the protrusions may be provided on plate/flange structure that is similarly positioned on or parallel to the radial upper wall of the filter top end, the plate/flange structure not necessarily being circular or cylindrical but preferably having a curved outer edge that may be called the curved perimeter of a filter surface, the filter surface being a flange surface. Thus, most preferably, the protrusion structure is provided at a location on the top end of the filter that has a diameter between the largest diameter of the housing and the diameter of the neck, for example, on an intermediate shoulder (see shoulder 32 in the filter of FIGS. 2 and 4) that is located radially beyond the diameter of the neck but not so far as to protrude radially beyond the largest-diameter portion/shoulder LP of the top end of the filter, or on protruding flanges that protrude substantially beyond the diameter of the neck but not so far as to protrude beyond the largest-diameter portion/shoulder of the top end of the filter (see plates/flanges 120, 130 in FIGS. 12-32). Thus, as shown by the drawings, and especially by the top view of filter 20 in FIG. 4 and the top view of filters 100 and 200 in FIGS. 17 and 24, the protrusion structure, and/or the perimeter/surface on which it is provided, may be described as being located between the largest-diameter portion/shoulder of the top end of the filter and the upending/central neck. One may describe the protrusion structure, and/or the perimeter/surface on which it is provided, as being intermediate in diameter between the diameter of the largest-diameter portion/shoulder of the top end of the filter and the diameter of the outer wall of the neck. One may describe the largest-diameter portion/shoulder of the top end of the filter as being a radial distance from the neck outer wall and may describe the protrusion structure and/or its key protrusions as being located a radial distance from the neck outer wall that is greater than 50 percent of said radial distance between the largest-diameter portion/shoulder of the top end of the filter and the neck outer wall. While other configurations may be effective, for example, protrusions on the largest-diameter shoulder (LD in FIG. 2, 104 in FIG. 12), intermediate-diameter configurations typically allow a compact-sized holder to effectively mate with the top end of the filter without the holder being required to extend out and down to surround the largest diameter of the top end of the filter. In especially-preferred embodiments, keyed plate/flanges, or "wings", protrude out from the top end of the filter near the shoulder of the filter upper end but preferably above the largest-diameter portion of the housing and below the neck, and having an outer diameter at the keyed outer edges of the flanges that is intermediate between said largest-diameter and the neck diameter. In the direction transfer to the direction in which the protrusions extend, the flanges are relative narrow, for example, forming a rectangular shape in top view. These embodiments of keyed structure may be applied to filters having various styles of fluid connection, for example, various styles of neck structure containing fluid inlet and outlet ports.

By "holder" is meant any of a variety of devices that receive and seal to a replaceable filter or filter cartridge. This can include a valve head (including valving to shut off piping when the filter is removed), a filter bracket that supports the filter and provides fluid flow conduits into and out of the filter, and other devices that contact and are in fluid communication with the filter.

By "filter" or "filter cartridge" is meant any container of filtration or treatment media that is connected to a holder for fluid communication with the holder to filter and/or treat the fluid brought into it via the holder. The keyed system invention may be applied to whatever structure of a filtering unit is inserted into the head or other holder, which might be a unitary filter or a filter cartridge encased partially in an outer housing below the level where the filter engages in the head.

BRIEF DESCRIPTION OF THE DRAWINGS

FIG. 1 is a bottom perspective view of one embodiment of a filter head according to the invention, illustrating one embodiment of recesses for the invented key system.

FIG. 2 is a top perspective view of one embodiment of a filter according to the invention, illustrating an embodiment of protrusions for the invented key system cooperating with the recesses of the filter head of FIG. 1.

FIG. 9 is a top view of the filter head of FIGS. 1, 3, 5-8, with the filter removed.

FIG. 10 is a side cross-sectional view of the filter of FIGS. 1, 3 5-9, with the filter removed, viewed along the lines 10-10 in FIG. 9.

FIG. 11 is a side cross-sectional view of the filter of FIGS. 1, 3 5-10, with the filter removed, viewed along the lines 11-11 in FIG. 9.

FIGS. 12-18 illustrate a perspective, first side, front, second side, rear, top, and bottom view, respectively, of an especially-preferred embodiment of a keyed filter, having a flange system that protrudes radially from the upper end of the filter housing, above the largest-diameter portion/shoulder and below the top end of the neck. The flange system comprises first and second (right and left) flanges, wherein each flange preferably comprises multiple key protrusions, separated by notches/indents in the outermost edge of each flange. The embodiment of FIGS. 12-18 comprises one flange having three key protrusions (two notches/indents) and one flange having two key protrusions (one notch/indent).

FIGS. 26-32 illustrates a perspective, first side, front, second side, rear, top, and bottom view, respectively, of yet another alternative embodiment of the keyed filter of the type shown in FIGS. 12-18. One of the flanges comprises two key protrusions (one notches/indents) of different circumferential lengths, and the other, opposing flange comprises only a single protrusion structure as it has no notches/indents. Thus, this embodiment illustrates that the invention comprises at least one protrusion structure comprising multiple key protrusions, but there are many versions of the keyed system wherein not all of the protrusion structures have multiple key protrusions. The central neck of this embodiment is shown in dashed lines to denote that alternative neck structure comprising fluid inlet and outlet ports may be used, or alternative fluid inlet and outlets ports may be used that do not necessarily take the form of an upending neck.

FIG. 33 portrays axial insertion of the filter into the holder, and FIG. 34 portrays circumferential rotation. While the arrow in FIG. 34 may suggest that the holder is rotated onto the filter, it will be understood that the filter will typically be rotated relative to a stationary holder to install the filter into a holder that has previously been connected to fluid inlet and outlet conduits.

FIGS. 35-37 further illustrate the assembled holder plus filter combination. The holder plus filter assembly is shown in a front view in FIG. 35, with the holder in cross-section. The assembly is shown in the top view of FIG. 36, with the filter having been inserted up into the cavity of the holder before any relative rotation of the filter and holder. The assembly is shown in the top view of FIG. 37, after the relative rotation of the filter and holder (the holder rotated in the direction of the arrow in FIG. 36) that locks the filter in the holder due to the protrusions being received and retained in the circumferential slots/recesses in the head. In each of FIGS. 36 and 37, the position of the plate/flange structure inside the head is shown in dashed lines.

FIGS. 38 and 39 show side and bottom views of the holder, respectively, wherein view line 39-39 is included in FIG. 38 to assist the reader in understanding FIG. 39.

FIGS. 40 and 41 show vertical cross-sectional views of said head, wherein FIG. 40 is viewed along line 40-40 in FIG. 39 and FIG. 41 is viewed along line 41-41 in FIG. 39.

FIG. 42 shows a top cross-sectional view of a lower portion of the head, viewed along the line 42-42 in FIG. 38.

FIG. 43 is a top view of the top end of the filter and the lower cross-section of the holder as in FIG. 42. The filter flanges being inserted up into the lower cross-sectional portion of the holder, wherein one may see the three key protrusions (toward the left of the figure) sliding axially through mating axial recesses of a first recess structure in the holder, and two key protrusions (toward the right of the figure) sliding axially through mating axial recesses of a diametrically-opposing recess structure in the holder.

FIG. 44 is a top view of the holder having been rotated (in the direction shown by the arrow in FIG. 42) relative to the filter, until the key protrusions of the flanges are captured in the two diametrically-opposed circumferential recess portions (also called "circumferential lock portion") of the two recess structures of the holder. In this relative position of the filter and the holder, the filter is captured in the holder and restrained from dropping out of the holder in the axial direction unless the filter is rotation in the opposite direction relative to the holder so that the key protrusions may drop down through the axial recesses for removal of the filter.

Figure 4:
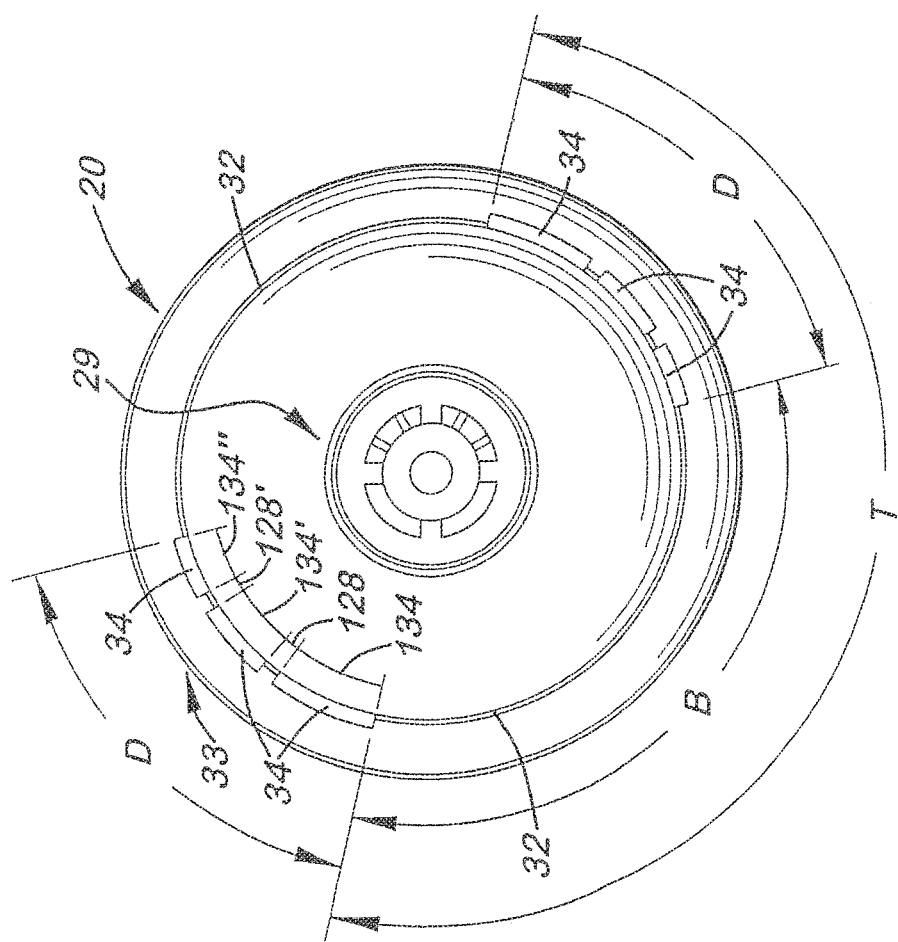
FIG. 4 is a top view of the filter of FIG. 2.

Therefore, FIGS. 33-44 portray an embodiment wherein three key protrusions (on one side of the filter) slide axially through axial recess portions of a first recess structure in the holder and then, upon rotation, preferably all three key protrusions will slide into a single circumferential recess portion of said first recess structure. Also, the two key protrusions (on the opposing side of the filter) will slide axially through axial recess portions of a second recess structure also in the holder (that, in this embodiment, is diametrically opposed the first recess structure) and, upon rotation, preferably both of the two key protrusions will slide into a single circumferential recess portion of said second recess structure. Thus, three key protrusions preferably slide circumferentially into a single (one) "circumferential recess portion" of one recess structure, and two key protrusions preferably slide circumferentially into a single (one) "circumferential recess portion" of another recess structure.

DETAILED DESCRIPTION OF PREFERRED EMBODIMENTS OF THE INVENTION

Referring to the Figures, there are shown several, but not the only embodiments of the invented key system. As will be further described below, and as understandable from the Figures, keyed structure is provided on perimeters/surfaces of filters and cooperating holders, wherein the perimeter/surfaces may take various forms, such as shoulders, plates, flanges, or wings, for example. FIGS. 1-11 illustrate a keyed filter embodiment of the invented keyed system, wherein the embodiment may be called a "keyed shoulder" embodiment because the protrusion structure is on a shoulder at a location slightly above, and radially inward, from the largest-diameter portion of the top end of the housing, wherein the shoulder has a diameter between said largest-diameter portion and the neck of the filter. FIGS. 12-44 illustrate alternative embodiments of filters and cooperating filter heads, which may be called a "keyed flange" embodiments, wherein the keyed structure is also located between the largest-diameter portion of the filter top end and the neck of the filter, and comprises keyed plates/flange(s) connected to the upper radial surface of the filter housing and extending out generally parallel to said upper radial surface away from two sides of the base of the central neck.

The key system structures are located on surfaces of filters and holders that contact each other during connection of the filter to the holder. The preferred keyed structures are on surfaces that are involved in mainly or solely providing a physical (mechanical) connection between the filter and holder rather than providing a fluid connection between the filter and the holder. In filters comprising fluid inlet and outlet ports at or near the longitudinal, central axis of the elongated filter (for example, in an upending neck), the shoulder and upper radial surfaces of the filter typically do not liquid-seal to the filter holder/valve-head. However, whatever portion of these surfaces must fit up inside the interior cavity of the valve-head are candidates for keyed system mating with the cooperating surfaces of the interior cavity. In other words, one or more shoulders and/or the upper radial surface of the filter top end typically have areas that come in very close contact to surfaces of the interior cavity of the holder/valve-head, but they are not directly involved in forming a liquid seal between the filter and the holder/valve-head. These non-liquid-sealing areas may be keyed so that only a filter with a certain keyed surface shape may extend far enough up into the holder/valve-head to be installed and locked into place.

The protrusions of the key system may extend from or be connected to the upper radial surface of the filter top end, including, but not necessarily limited to, protrusions on a circular/cylindrical intermediate shoulder on the upper radial surface of the filter (see the embodiment of FIGS. 1-11), or protrusions on plate-like structures connected to the upper radial surface and/or to the neck and extending preferably in two directions away from the filter neck (see embodiments of FIGS. 12-44). The protrusions in each of these embodiments mate or "nest" in identically-located recesses on the inside surface of the holder/valve-head that receives the filter, wherein the mating/nesting serves both the purpose of allowing the filter to be axially inserted into the holder/valve-head and also (upon rotation) to lock the filter into the holder/valve-head. Therefore, the key system of the preferred embodiments is not a system for keying axial insertion but accomplishing locking/securement by other means (such as threaded connection or clamps) but is rather a system for both keying the axial insertion and locking-securing the filter into the holder/valve-head.

The keyed structure may be said to be located around the outer circumference and/or on an outer-edge of a portion of the top end of the filter and the cooperating or corresponding inner circumference of the valve-head cavity. Preferably at least one of the protrusion structures provided on the filter top end comprises multiple key protrusions located within an arc of about 90 degrees or less around the circumference/outer-edge on which it lies, or more preferably within about 70 degrees or less. The cooperating recess structure is preferably located in the cavity surface, facing the filter top end, and, likewise, the same number of axial recesses are located within the same amount of circumference/outer-edge, preferably about 90 or less, and, more preferably, about 70 degrees or less. While this preferred key system locates the protrusions on the filter and the recesses on the head, the opposite is envisioned, wherein the protrusions may be inside the filter head and the recesses may be on the filter.

The key system structure of the various sets of filter and cooperating holders/valve-heads is typically invisible once the filter is installed. This may result in differently-keyed filters having substantially-similarly-shaped outer housing surfaces, and, hence, substantially the same exterior appearances. Also, this may result in differently-keyed holders/valve-heads having outer surfaces of the same shape, and, hence, the same exterior appearances. A manufacturer may include indicia on the outer surface of the filter and the outer surface of the holder/valve-head to indicate the different media or other filter differences and to indicate what filter will mate with the particular holder/valve-head. Also, a user may look at the key system structure as long as the filter is uninstalled. In any event, when the user attempts to install a filter, only properly-keyed filters can be installed into the holder/valve-head.

The following discussion describes the preferred embodiments shown in the Figures, plus comments on some variations. One of average skill may envision alternative embodiments besides those mentioned that are within the scope of the invention.

Keyed Filter, FIGS. 1-11

Referring to FIGS. 1-11, there is shown one, but not the only, embodiment of the invented key system for a filter and a filter holder (herein also called a filter "head"). The preferred filter head 10 and cooperating filter 20 are illustrated separately in FIGS. 1 and 2, wherein one may see the "lock" recess structure included in the head 10 and the "key" protrusion structure included on the filter 20. One may understand from this Description that embodiments of the invention also include a mirror-image arrangement, wherein "key" protrusions are on the head 10 and cooperating "lock" recesses are on the filter 20. Or, a combination of the two arrangements may be used, wherein one or more sets of "lock" recesses are on the head and cooperating "key" protrusions are on the filter, plus one or more sets of protrusions on the head and cooperating recesses on the filter.

The preferred embodiment of filter head may be of the general type illustrated by the systems in U.S. Pat. No. 4,857,189 and Design U.S. Pat. No. 356,625, and, once the disclosure of the present invention is viewed, one of skill in the art will be able to construct a filter head that will be operative and operatively connect with a cooperating filter. Filters conventionally built for such filter head systems are shown in U.S. Pat. No. 4,857,189 and Design U.S. Pat. No. 356,625, for example.

In the preferred embodiment, the recess structure 22 in the head comprises an axial portion and a circumferential portion. The axial portion preferably comprises a plurality of axial recesses 24 in the inner, lower surface of the head 10, which might be called the "inside rim" of the filter head near the outer edge 23 of the head. The axial recesses 24 are separated by partition ridges 28, which are spaced apart on, and protrude radially inward from, the surfaces of the lock recesses 24. In combination with adjacent ridges 26', partition ridges 28 define the circumferential length of each axial recess 24. The circumferential portion 40 of the recess structure 22 comprises a circumferentially-extending slot or other recess, generally but not necessarily exactly, transverse to the axis of the head 10 and the filter 10 and located "above" ridges 26.

In the preferred molded structure of the interior of the head 10, ridges 26 and partition ridges 28 serve as obstacles for any improperly keyed filter to be inserted into the filter head 10, and also, once the filter has been rotated on its axis, as obstacles for filter removal. Once the filter is inserted axially past the partition ridges 28, by the key protrusions 34 sliding into the head through the axial recesses 24, the filter may then be rotated so that the key protrusions 34 (preferably multiple key protrusions 34) slide circumferentially into the circumferential recess portion 40. The filter is preferably operable only once the filter has been inserted axially to the full extent desired and the filter has been rotated to lock the filter into head, and preferably only a properly-keyed filter can be installed.

The ridges 26 illustrated in FIG. 1 are one example of many embodiments that help to define the lower boundary of the circumferential recess portion 40, and that lock the filter from axial movement by retaining the key protrusions 34 in the circumferential recess portion 40. The plurality of closely-spaced ridges 26 are preferred because they provide a barrier to axial filter movement while minimizing the amount of plastic needed in molding of the head 10. Alternatively, each set of ridges 26 may have the space between the ridges 26 filled in, that is, replaced with a solid, continuous structure that protrudes, relative to the circumferential recess portion 40, inward toward the central axis of the head. Or, ridges 26 may be reduced in number or only occupy part of the space below the lock portion 40. In other words, the structure located "below" the circumferential recess portion 40 near outer edge 23, and serving as an obstacle to axial movement, may be of various shapes, size, and locations as long as one or more key protrusions 34 on the filter is blocked by said structure. At a minimum, therefore, there should be inwardly-protruding structure below at least one or more key protrusions 34 when one or more of the key protrusions 34 in positioned in the circumferential recess portion 40. Not all key protrusions need to be received/engaged in the circumferential recess portion, when the filter is "fully rotationally engaged," which means the point at which the filter is rotated to the fullest extent allowed by a rotation stop in the circumferential recess portion. To limit rotation of the filter, specifically, to limit circumferential movement of the key protrusions 34 in the circumferential recess portion 40, a rotation stop surface 41 is provided by extensions of ridges 26 or other structure. Thus, circumferential recess portions of various lengths will have a rotation stop surface, even in the case of closely adjacent sets of lock recesses to prevent rotation of the key protrusions past the circumferential recess portion and into the space above the adjacent set of axial recesses. The rotation stop surface preferably comprises the circumferential recess portion having a closed end or other abutment surface against which abuts one of the key protrusions when the filter is fully-rotated.

In the head 10 of FIGS. 1-11, each of the recess structures has three axial recesses 24 that are of different circumferential lengths, specifically, three recesses of long, medium and short length relative to each other. Other numbers and lengths/sizes may be used, for example, two or four recesses, or more, and one long and two short recesses, or two long and two short recesses, or a plurality of recesses all of differing lengths. As in a lock and key system for a door latch, many different combinations may be devised, and are included in the invention.

While there may be only one recess structure and one cooperating protrusion structure, there are preferably more. Preferably, there is a plurality of recess structures in the filter head, and most preferably, there are two recesses structures (each with axial recess portions and a circumferential recess portion) that are diametrically opposing each other, as in FIGS. 1-11. Preferably, therefore, the cooperating protrusion structures number the same as the recess structures, for example, two protrusions structures diametrically opposing each other on the filter.

Figure 3:
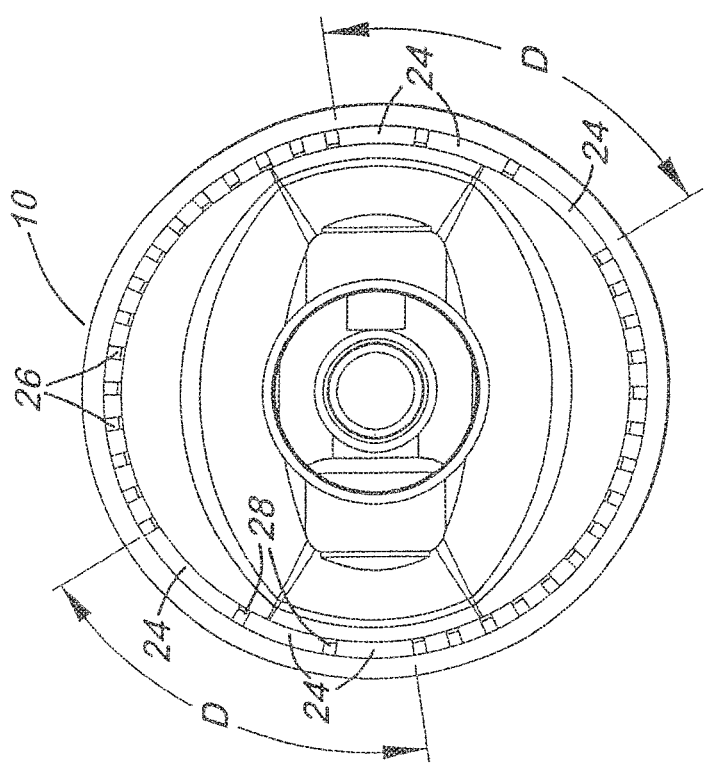
FIG. 3 is a bottom view of the filter head of FIG. 1, showing particularly the interior surfaces of the filter head.

Referring to FIGS. 3 and 4, one may see that the circumferential distances of greatest interest may be described as:

D, which is the circumferential length of the preferred axial recesses 24 and the circumferential length of the preferred cooperating protrusions structure 33 (made up of multiple key protrusions 34);

B, which is the distance between the axial recesses 24 or between the cooperating key protrusions 34, wherein B includes the circumferential recess portion 40 of the recess structure, wherein circumferential recess portion 40 may exist in the range of only a small part of distance B to substantially all of distance B except for a small rotation stop surface; and T, which is the total distance between the "start" of one set of axial recesses 24 or cooperating key protrusions 34 and the "start" of the adjacent set.

The absolute lengths of D, T, and B, and the lengths of D, T, and B relative to each other, may be varied. In the example of two recess structures (and therefore the two cooperating protrusion structures) each of the two sets may have different D lengths.

In FIG. 1, the first set of axial recesses 24 is clearly shown, and the second set of axial recesses, located about 180 degrees (distance T) from the first set, is located at position 25 on FIG. 1. Thus, these two sets of axial recesses shown in the Figures are generally diametrically opposed, with the axial recesses 24 taking up 70 degrees (distance D) and the circumferential recess portion 40 taking up about 70 degrees of the 110 degrees (distance B) which extends between the two sets axial recesses 24. This results in each part of a recess structure 22 being 180 degrees away from the corresponding part of the other recess structure, and the two recess structures 22 being spaced evenly around the entire 360 degrees.

Preferably, the circumferential recess portion is as long as the entire length of the key protrusions, however, this is not always necessarily the case. The recess structures 22 may be closer together (distance T) than 180 degrees, for example, with two identically-constructed or differently-constructed recess structures spaced 90 degrees (distance T), for example, in which case the lock recesses 24 might take up about 70 degrees of that 90 degrees, leaving up to slightly less than 20 degrees (20 degrees minus enough distance for a small rotation stop surface) for the circumferential recess portion 40. This would be an example of an embodiment in which the circumferential recess portion is not as circumferentially long as the circumferential length of the axial recess portion. In such an embodiment, only some of the key protrusions 34 (or part of a key protrusion), would slide circumferentially into ("be engaged in") the circumferential recess portion, while some of the key protrusions 34 (or part of a key protrusion) would not be received ("not engaged") in the circumferential recess portion; this would be sufficient, although not preferred, for locking the filter in the head. In the case of the circumferential recess portion being shorter in length than the total length of the key protrusions and a key protrusion(s) being unengaged in the circumferential recess portion, one or more key protrusions or a part of a key protrusion, in effect, would hang over the axial recesses. In such a case, the unengaged key protrusion(s) might still be supported by one or more ridges 28. As long as some of the key protrusion(s) is/are engaged in the circumferential recess portion, the filter is engaged in the head, until the filter is rotated in reverse to an unlock point, that is, to a point where all necessary key protrusions slide can slide down through the axial recesses.

Another example would be to have the two recess structures within only a portion of the circumference of the head 10, for example, within 180 degrees (for two recess structures where T=90 degree) or 270 degrees (for two recess structures where T=135 degrees).

Preferably, the axial recesses of each recess structure are all contained within 90 degrees or less (distance D) or, more preferably, within 70 degrees or less (distance D). Especially preferred embodiments have axial recesses (and likewise cooperating key protrusions) from a maximum of 70 degrees down to a minimum of 30 degrees on the circumference of the inner rim of the filter head. Less than 30 is also possible, but is less preferred. In FIG. 1, the first set of axial recesses is within about 70 degrees ("D" in FIGS. 3 and 4).

Distance B may be within a wide range of lengths. For example, preferably, but not necessarily, B may be up to about 150 degrees (B equals 150 degrees when, for example, D is 30 degrees and T is 180 degrees) and down to about 30 degrees (B equals 30 degrees when, for example, D is 70 degrees and T is 100 degrees; or B equals 30 degrees when, for example, D is 30 degrees and T is 60 degrees). Other B distances may be outside the range of 30-150 degrees, particularly when B is very large (greater than 150 degrees) because D is very small (less than 30 degrees) or when B is very small (less than 30 degrees) because the two sets of recesses are very close together. In the case where B is very small, one would expect many of such embodiments to have circumferential recess portion only a fraction of the length of D, that is, only part of the key protrusions would fit into the circumferential recess portion before hitting a rotation stop surface in the circumferential recess portion.

Also shown in FIG. 4 are circumferential lengths 134, 134', 134" of the key protrusions (which preferably equate to very slightly less than the circumferential lengths of the matching axial recesses 24), and the circumferential lengths of spaces (notches/indents) 128, 128' between the protrusions (which preferably equate to very slightly more than the circumferential lengths of the matching ridges 28). Preferably, but not necessarily, lengths 134, 134', 134" (which are not necessarily equal to each other) are much greater than the lengths of the spaces 128, 128' (which are not necessarily equal to each other). For example, preferably the lengths of said protrusion are at least twice that of said spaces, and, more preferably three times or more.

FIG. 2 illustrates a filter 20 that is keyed to cooperate with the head 10 of FIG. 1. The central neck 29 of the filter contains the connections/seals for fluid communication between the filter and the head. Radially-spaced from the neck 29 is shoulder 32, which may be called an "intermediate shoulder" because it is located between the neck 29 and the outermost shoulder (largest-diameter portion LD) that serves, or is at or near, a junction of the axial side wall of the filter and the generally radial upper surface/wall of the top end of the filter. On shoulder 32 are two protrusion structures 33 each comprising a set of key protrusions 34 (that is, comprising multiple key protrusions 34), generally diametrically opposed to match the locations of the two recess structures (each comprising multiple axial recesses and one circumferential recess portion) in the filter head. Each set of key protrusions preferably includes the same number, size, and arrangement of key protrusions 34 as the filter head has axial recesses, so that the "key" of the filter fits into the "lock" of the filter head, in effect. The preferred key protrusions curve on the radius of the shoulder of the filter and have a curved outer surface from top to bottom. To match the axial recesses, each set of key protrusions in the embodiment of FIG. 2 include three "end-to-end" protrusions, sized large, medium, and small, in circumferential lengths generally equal to the axial recesses in FIG. 1. In the embodiment portrayed in FIGS. 1 and 2, the key protrusions 34 protrude radially outward from a portion of the shoulder structure that is larger in diameter than the central neck 29 but that is smaller than the largest diameter of the filter top end (thus, an intermediate diameter). However, it may be noted that filters of many shapes, diameters, and structures, may be provided with embodiments of the invented key system, and the key protrusions may protrude out from other locations and other diameters on the filter. For example, the key protrusions may less-preferably protrude out from the largest diameter of the filter, from a shoulder that represents an intermediate diameter, or from other portions of the top end of the filter, such as the cap or top end structure that substantially forms/closes the top end of the filter and forms the transition between the axial sidewall of the housing and the central neck. An important consideration in the selection of key protrusion location is the size and spacing of the key protrusions, and how the filter head will receive and cooperate said key protrusions, especially in view of the preferred feature wherein more than one key protrusion slides circumferentially into a single circumferential recess portion (also called "circumferential lock portion") in the head. It is preferred that the key protrusions are located on a shoulder distanced from the central neck, or that they extend radially outward a significant distance from the central neck to be nearer to the largest-diameter portion of the filter housing than to the neck. This allows room for larger multiple key protrusions to be located within preferably 70-90 degrees on the filter, and so that there is sufficient space inside the filter head so that said multiple key protrusions may be slide circumferentially into their single circumferential recess/slot after sliding axially into the filter head.

Figure 5:
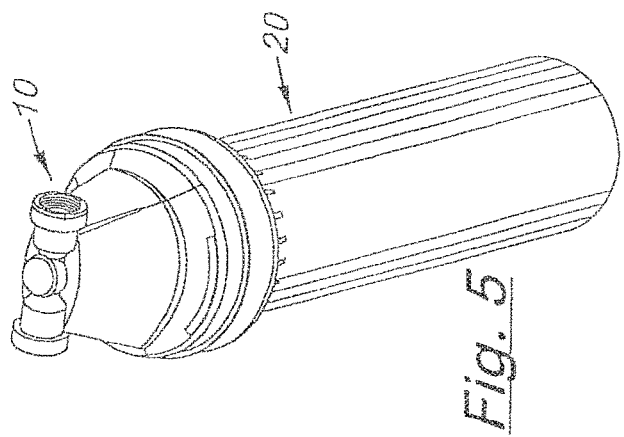
FIG. 5 is a top perspective view of the filter and filter head of FIGS. 1-4 connected together.
Figure 6:
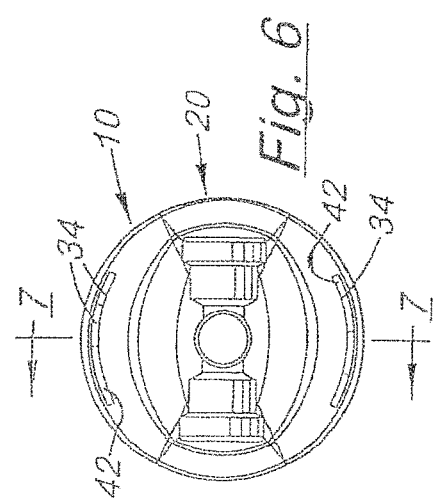
FIG. 6 is a top view of the filter and head combination of FIG. 5, with protrusions of the filter visible through apertures in the filter head.
Figure 7:
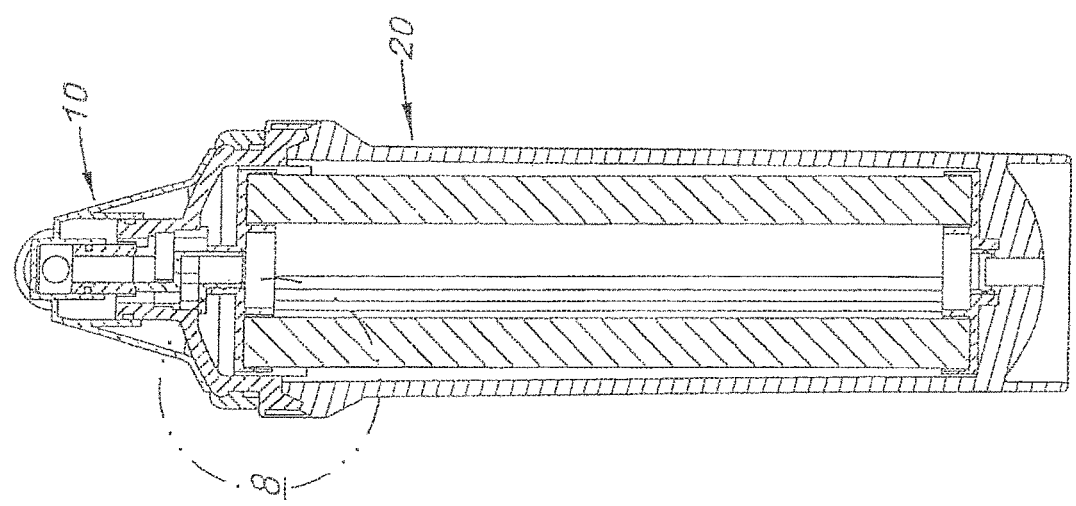
FIG. 7 is a side cross-sectional view of the filter and head combination of FIGS. 5 and 6, viewed along the lines 7-7 in FIG. 6.
Figure 8:
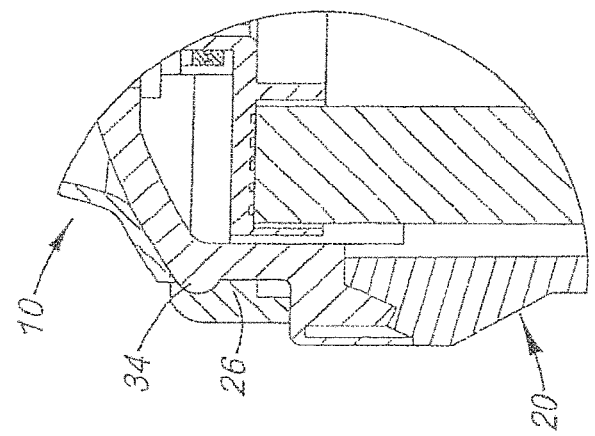
FIG. 8 is an enlarged detail view of a portion of the cross-sectional FIG. 7.
Figure 12:
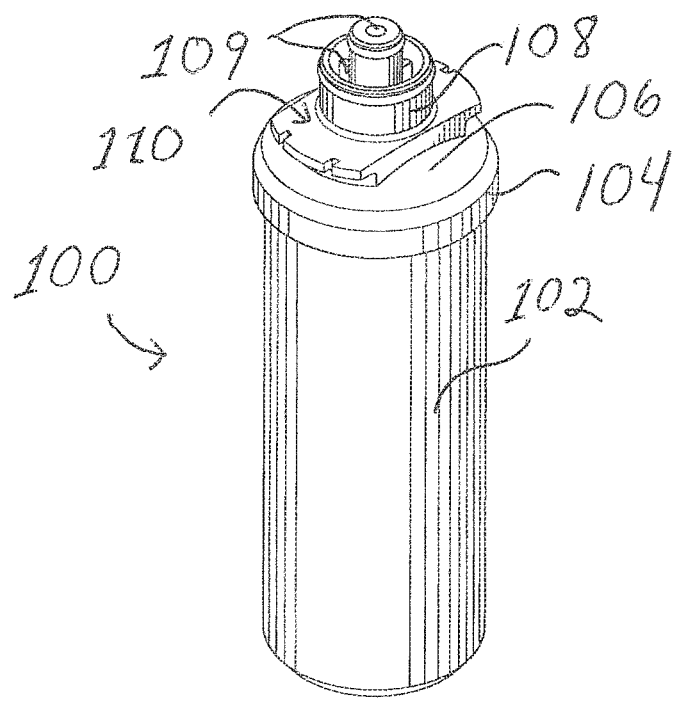
Figures 13, 14:
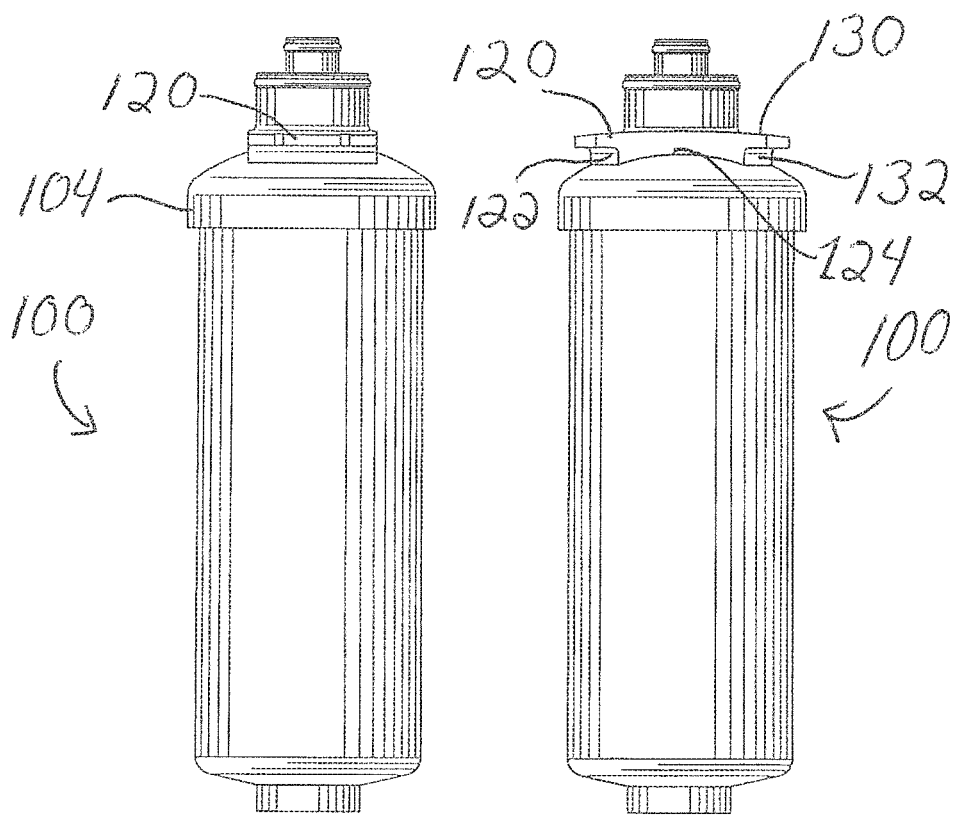
Figure 19:
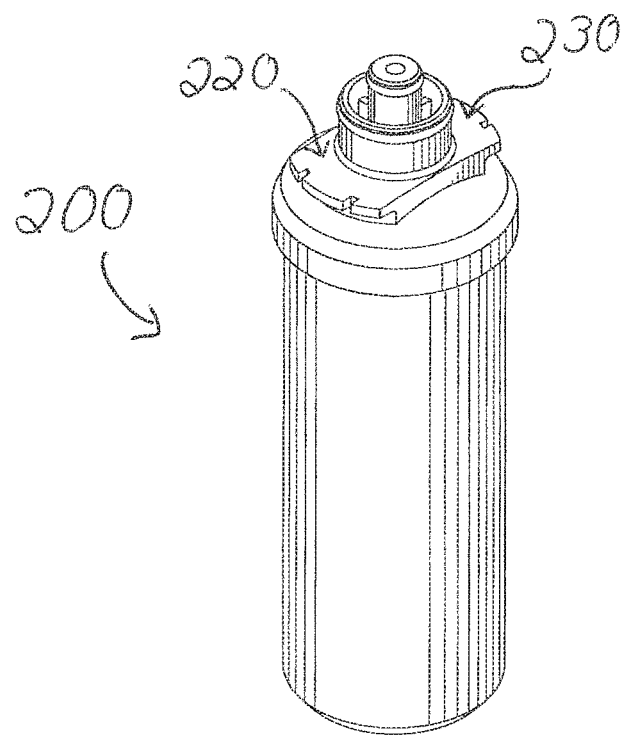
FIGS. 19-25 illustrate a perspective, first side, front, second side, rear, top, and bottom view, respectively, of an alternative embodiment of a keyed filter of the type shown in FIGS. 12-18. This embodiment comprises a three-and-three key protrusion system, with two notches/indents on one outermost edge of one flange and also two notches/indents on the outermost edge of the other, opposing flange.
Figures 20, 21:
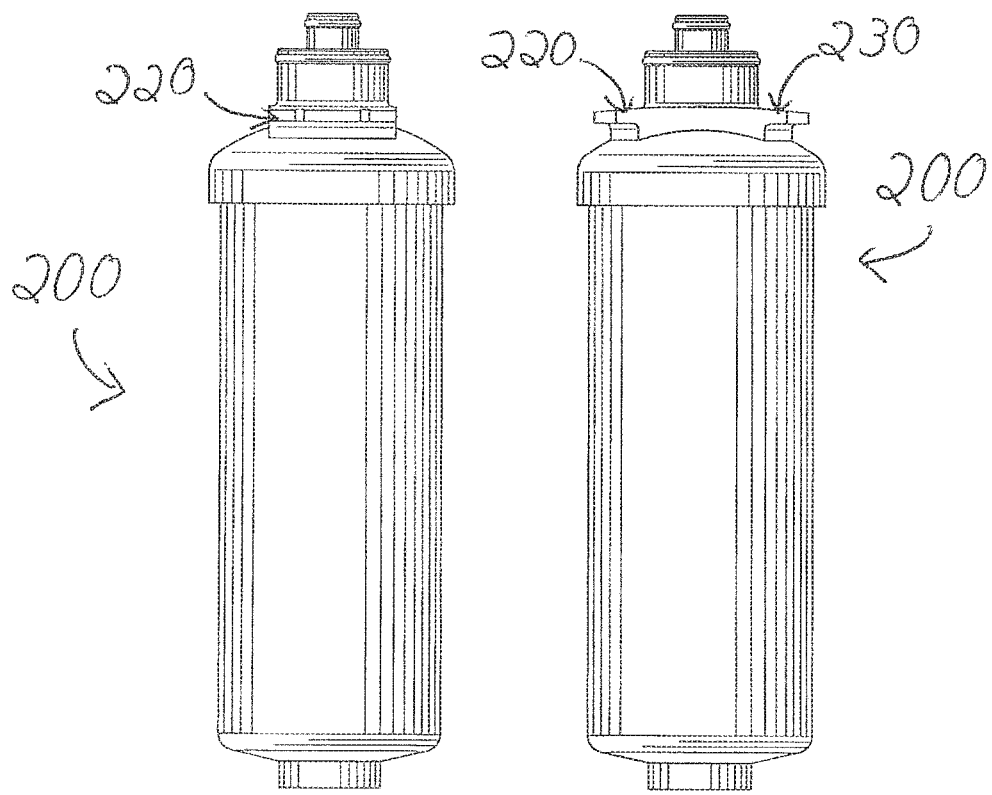
Figures 22, 23:
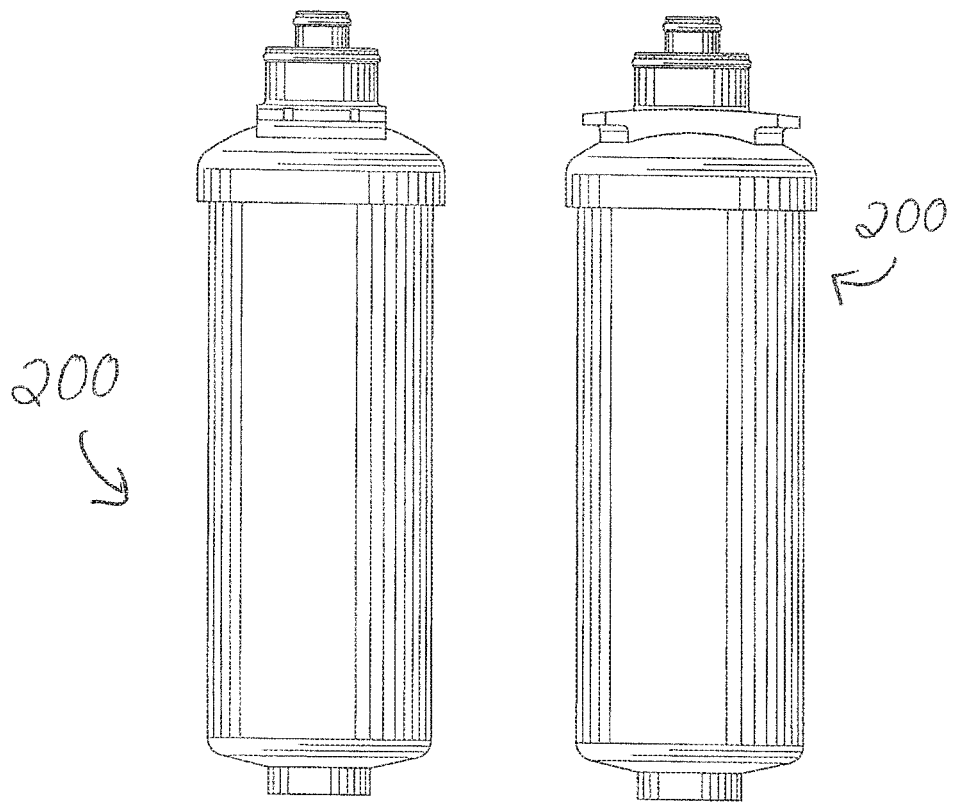
Figures 24, 25:
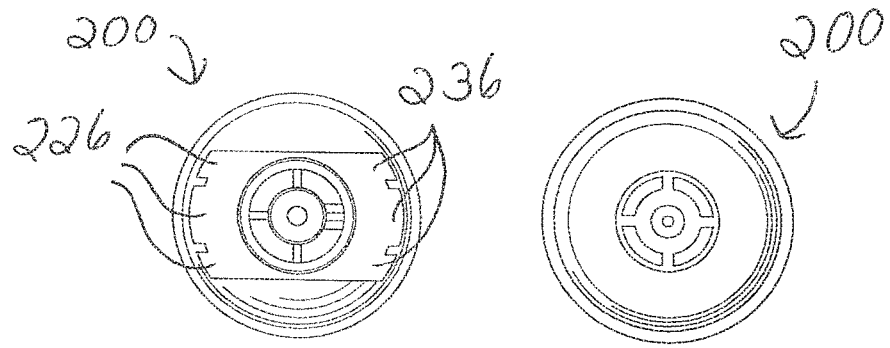
Figures 33, 34:
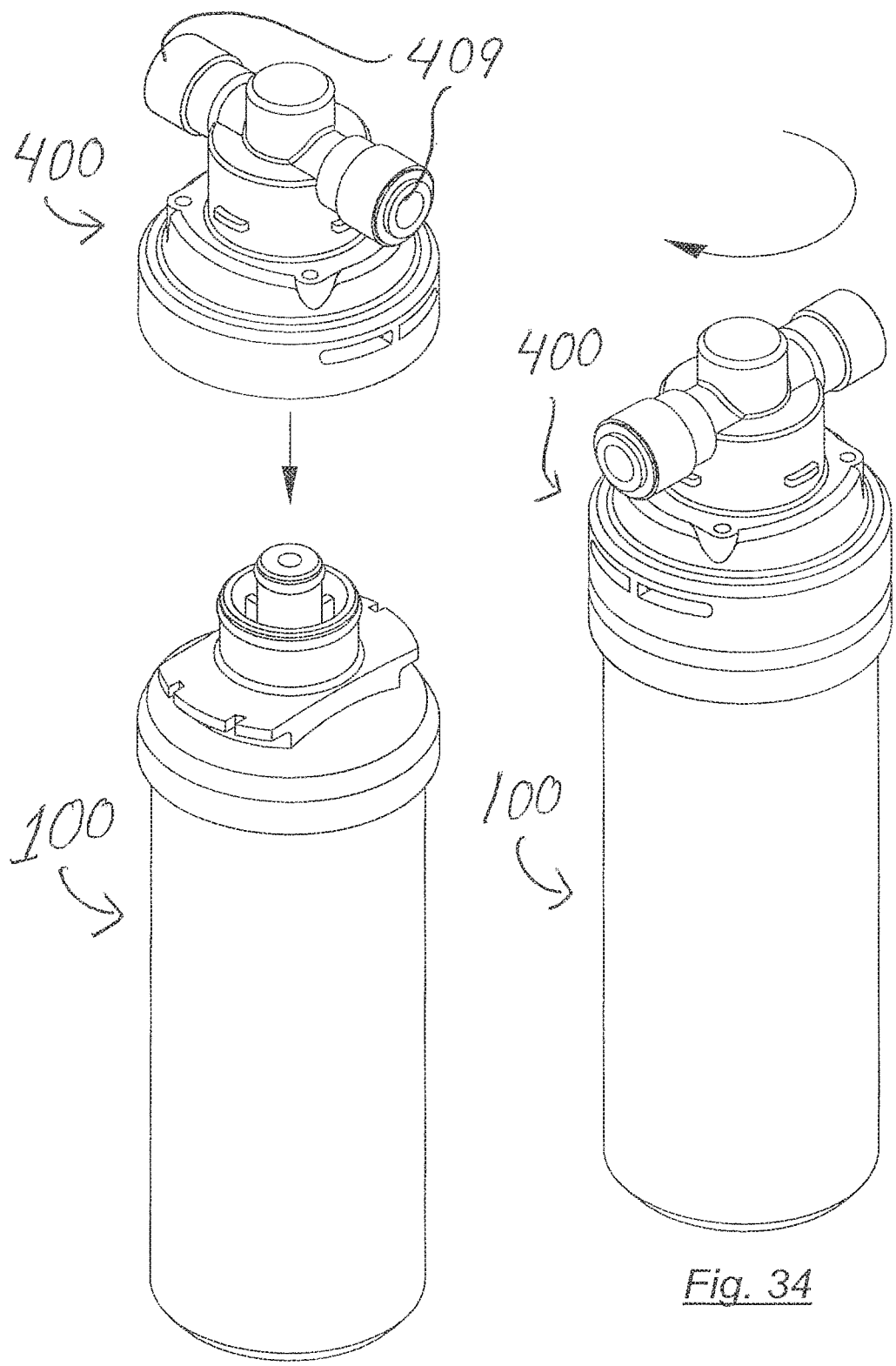
FIGS. 33-44 illustrate the filter of FIGS. 12-18 being installed in one embodiment of a filter head that is keyed to cooperate with said filter, as further described below.

In use, when the filter 20 is inserted into the head 10, the key protrusions 34 must be matched up with the axial recesses 24 so that the filter can be moved axially into the filter head. The key protrusions 34 slide into their corresponding axial recesses 24 (which are the first portion of the recess system) and the inner rim of the head extends down over the top of the filter. Then, the filter is rotated on its axis relative to the head to lock the filter into the head. This is made possible by the second portion of the recess structure of the filter head, the circumferential recess portion 40, which extends continuously above the ridges 26 for preferably, but not necessarily, a distance equal to or slightly greater than the total length of one set of key protrusions. When the filter is inserted and rotated, the key protrusions 34 slide circumferentially into the circumferential recess portion 40 of the recess structure until being fully rotationally engaged (rotationally limited by the stop surface at the end of the circumferential recess portion) and are "locked"

above the ridges 26 by virtue that they cannot be pulled axially downward past the ridges 26. When the filter is fully inserted and locked into the head, as shown in FIGS. 5 and 6, one may see the key protrusions 34 through the apertures 42 in the filter head wall. To remove the filter, the filter is rotated on its axis in the opposite direction to move the key protrusions 34 from above the ridges 26 to again align with axial recesses 24, so that the key protrusions may slide axially down and out of the head through the axial recesses. Friction, or a biasing means if desired, or other locking means, may be used to bias the filter from sliding in reverse out of the head until the user purposely removes the filter.

With the invented key system for filter and head, it is economical and convenient to mold sets of filters and heads with matching key system structure, and to mold many different sets with different key system structure. For example, for one application, a key system structure may include four lock recesses and four key protrusions in each of two sets on the filter and on the head, and the recesses and protrusions may be, for example, two short alternating with two long. For another application, a key system structure may include three recesses and three protrusions, all of which are long. Filters with the three-recess and protrusion key system would not fit into heads with the four-recess and protrusion key system, so there would be no chance of mixing-up the filters.

Keyed Filter Flanges, FIGS. 12-44

FIGS. 12-44 illustrate alternative embodiments of key protrusions extending from the top end of the filter at a location intermediate between the outer-most diameter (largest-diameter portion) of the top end and the central neck. The key protrusions may be part of a generally radial plate(s)/flange(s) that is/are connected or integral with the upper radial surface of the cap of the filter, wherein the generally radial plate(s)/flange(s) may be said to extend up and outward from the upper radial surface of the cap. In the embodiments portrayed, the plate(s)/flange(s) also are connected to the outer surface of the central neck, but extend a significant distance away from the central neck so that their outer edges are located nearer to the outer-most diameter of the filter top end than to the neck. The preferred generally radial plates/flanges protrude out from preferably two sides of the base of the neck, wherein these "right and left" (or first and second) plates/flanges may be connected by narrow plate/flange structure that extends "in front of" and "behind" the neck. Thus, the two plates/flanges may be two separate plates/flanges or may be considered portions of a single plate/flange that surrounds the neck but that protrudes farther to the right and left than to the front and rear.

Referring specifically to FIGS. 12-18, elongated filter 100 comprises a housing containing filter media (not shown), wherein the housing comprises a cylindrical axial sidewall 102, a largest-diameter shoulder 104, an upper radial wall 106, and a central neck 108 that includes fluid inlet and outlet ports/passages 109.

Between the upper radial wall 106 and the neck 108 is a flange structure 110 that is keyed to mate with a cooperating holder 400. The preferred flange structure 110 sweeps upward from the radial wall 106 and outward in two directions (called herein, for convenience, the right and left) away from the central neck to form two flange portions or "wings" 120, 130 that reach nearly out to the largest-diameter shoulder 104 of the filter. Preferably, the wings 120, 130 reach more than 50 percent of the way toward the largest-diameter shoulder 104 from the outer surface of the central neck, and, more preferably, 75-95 percent of the way, as portrayed to best advantage in the top views of FIGS. 17, 24, and 31. The junction of the wings with the upper radial wall 106 at the right and left is a curved junction 122, 132 about midway between the outer diameter of the central neck and the largest-diameter of the filter top end. The flange structure 110 extends less far in the forward and rearward directions, so that the junctions 124, 134 of the front and rear surfaces of the wings 120, 130 to the upper radial wall 106 are near the central neck. Thus, the flange structure 110 is a generally rectangular plate structure that extends farther to the right and left than to the front and rear of the filter. The two wings 120, 130 are connected to each other by narrow bars 140 of flange structure along the front and rear of the central neck, but, alternatively, the flange structure may not include these connecting structures and the flange structure may extend out away from the central neck without having a portion that passes around the front and rear of the central neck.

The keying of the filter 100 comprises at least one of the wings 120, 130 having multiple key protrusions, separated or defined by notches in the outer edge 121, 131 of the wings. In the embodiment of FIGS. 12-18, both wings 120, 130 have key protrusions, that is, key protrusions 126 (separated by notches 128) on wing 120, and key protrusions 136 (separated by notch 138) on wing 130.

As will be understood after reading the detailed description of the invented keying system in the Summary of the Invention and portions of the Detailed Description above, these key protrusions (three key protrusions 126 in one protrusion structure, wing 120, and two key protrusions 136 in the other protrusion structure, wing 130) are examples of many different key protrusions numbers, circumferential lengths, styles, and sizes that may be provided in the outer edges 121, 131 of the wings 120, 130. The key protrusions of filter 100 may be called a "three plus two" key protrusion structure, or a "two plus one" notch structure, for example.

FIGS. 19-25 illustrate a filter 200 very similar to filter 100, but the wings 220, 230 are keyed differently, specifically, in a "three plus three" key protrusion structure (key protrusions 226 and 236) or a "two plus two" notch structure. FIGS. 26-32 illustrate yet another filter 300 of generally the same structure as filters 100 and 200, except that only one of the protrusions structures (wing 320) comprises multiple key protrusions 326. The other protrusion structure (wing 330) has no notches to subdivide the protrusion structure, and so is said not to have multiple key protrusions.

It will be understood from the above description of the invented key systems, that the notches need not be evenly spaced along the outer edges of the wings, and, therefore, the key protrusions of these embodiments may have different arc/circumferential lengths (so-called because the outer edges are curved). For example, for a three-key-protrusion set, one may be short and two may be relatively long, or one may be short, one may be medium, and one may be long. For a two protrusion set, for example, one may be short and one may be relatively long. The entire circumferential length of the outer edge 121, 131 of the wings corresponds to preferably less than a 90 degree arc, and more preferably less than a 70 degree arc.

FIGS. 26-33 show the central neck in dashed lines to remind the reader that alternative neck structure may be provided and/or that fluid connection may be made without an upending central neck by providing alternative ports or passages in the filter upper end. Concentric ports/passages at the central axis of the filter are preferred, however, because they may mate with cooperating tubes/passages of the holder/head while the filter is installed by a method that includes axial insertion followed by rotation of the filter on its axis relative to the head.

A preferred holder 400, with liquid inlet and outlet conduits 409, is portrayed in FIGS. 33-44, alone and in combination with filter 100. The holder 400 comprises a recess structure 420, 430 for each protrusion structures (each wing 120, 130) on the filter 100. Each recess structure 420, 430 comprises at least one axial recess portion and a single circumferential recess portion. For wings that comprise multiple key protrusions, the respective recess structure comprises multiple axial recesses that match/mate with the key protrusions of that wing. One may note that, for wings that do not have multiple key protrusions (for example, see the non-notched wing 330 of the embodiment of FIGS. 26-32) only one axial recess is required. The recess structures comprises axial recesses 426, 436 that match the length and number of the key protrusions 126, 136, so that said axial recesses 426, 436 can receive the key protrusions during axial insertion of the filter up into the head, without the partition ridges 428, 429 blocking the key protrusions 126, 136. Therefore, the filter 100 is inserted up into the holder 400, with the filter positioned so that the key protrusions 126, 136 slide up through axial recesses 426, 436 until the key protrusions 126, 136 pass the partition ridges 428, 429 to be above the ridges 428, 429. At this point, the filter may be rotated on its axis, so that each set of key protrusions (the set on wing 120, and the set on wing 130) slides circumferentially in the direction of rotation into the circumferential recess portion 440, 450 of its respective recess structure, said recess portions 440, 450 being in mechanical connection and communication with said axial recesses 426, 436, respectively, for example, by means of the ends of said recess portions 440, 450 closest to said axial recesses 426, 436 being open to the top ends of the axial recesses.

Below and defining the lower edge of the circumferential recess portions 440, 450 are ledges 460, 462 with radially-protruding ridges 464; the substantially continuous ledges 460, 462 with spaced ridges 464 below the ledges 460, 462 are preferred because they provide a barrier to axial filter movement while minimizing the amount of plastic needed in molding of the head 400.

Figures 38, 39:
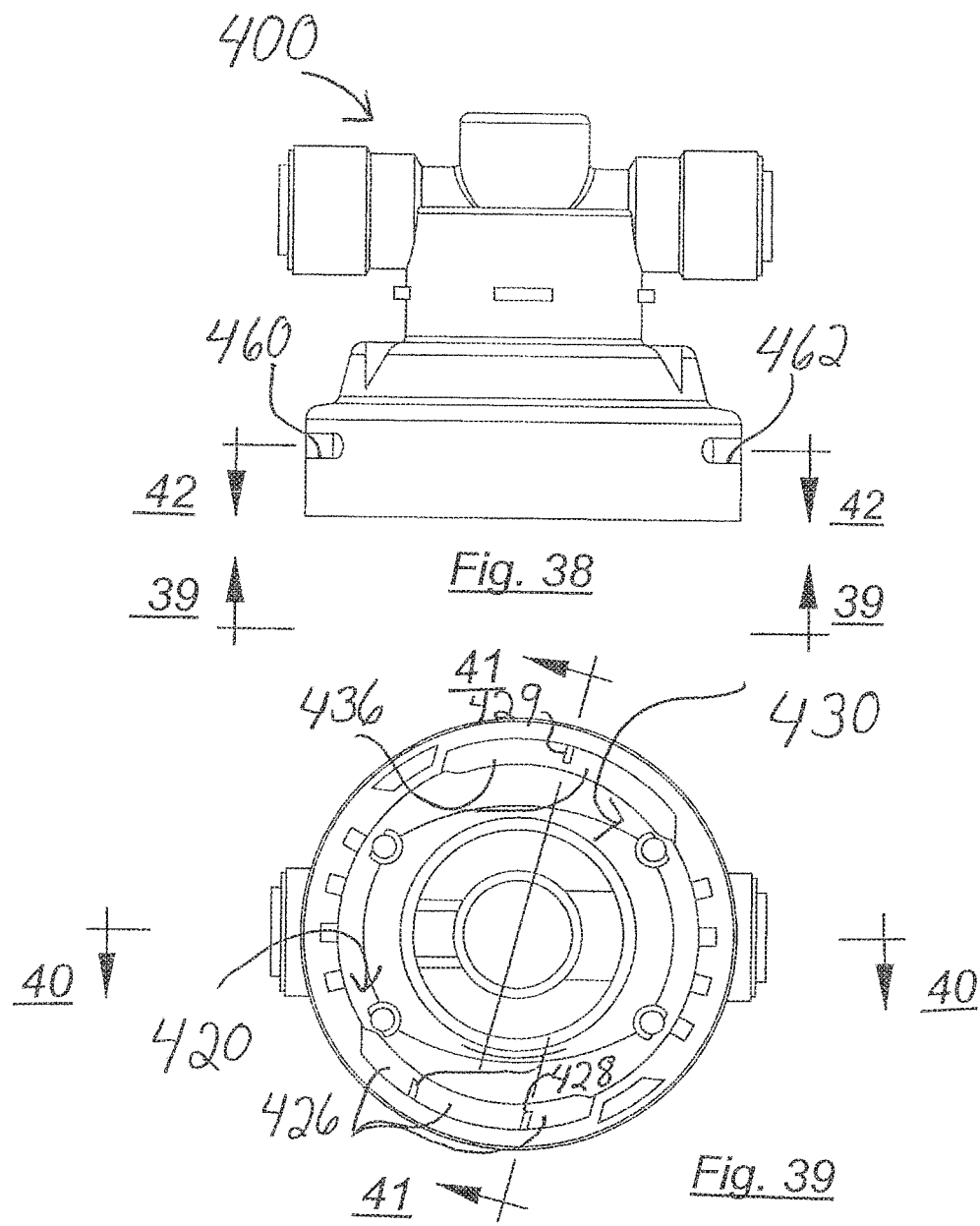
Figure 41:
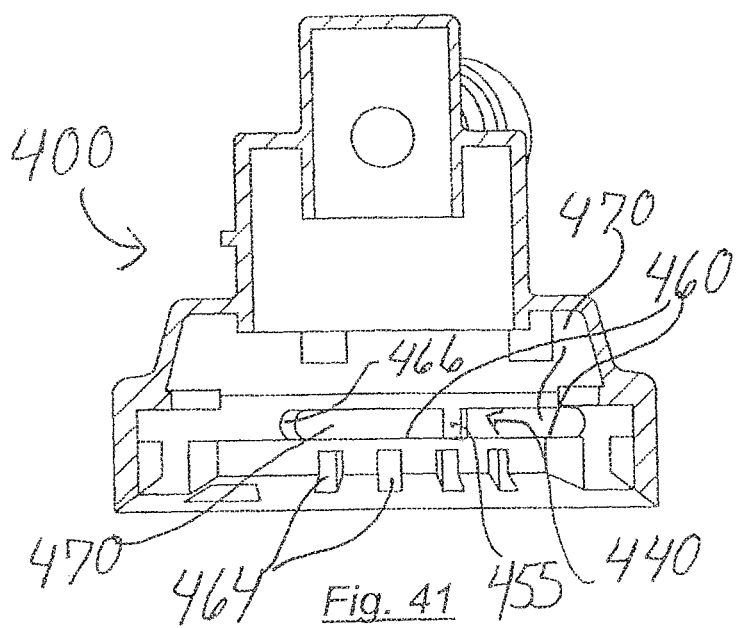
Figure 42:
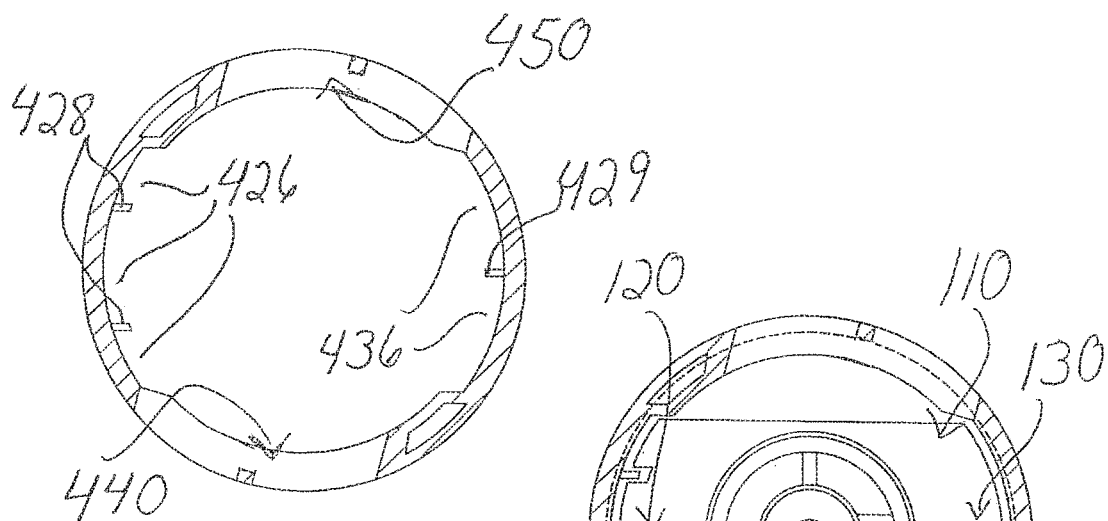
Figure 43:
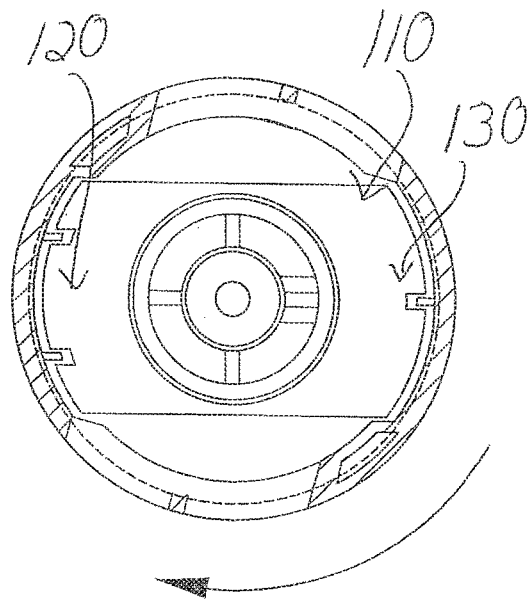

Circumferential recess portions 440, 450 may be open at their outer perimeters, rather than having a solid wall(s) at their outer perimeters/outer extremities; the "outer perimeter" of circumferential recess portion 440 is called-out as 470 in FIG. 41 and is understood to be an aperture all the way through the wall of the holder. It is the ledges 460, 462 below the received wings 120, 130 that block the filter from being pulled out of the holder (rather than any outside structure radially distanced out from the received wings 120, 130). Therefore, as shown in FIG. 38, because the recess portions 440, 450 are open at part or all of their outer perimeters, the ledge 460, 462 of each circumferential recess portion 440, 450 is visible from outside the holder 400. A small portion of the outer perimeter of the recess portion 440, 450 may be closed, for example, in the form of a bar or reinforcing strut 455 that strengthens the holder in the vicinity of recess portions 440, 450. A rotation stop surface 466 is provided, for each circumferential recess portion 440, 450, to limit rotation of the key protrusions. The rotation stop surface may be provided by closing the end of each recess portion 440, 450 that is opposite the end near the axial recesses, and/or by providing various styles of abutment surface, for example, an abutment surface that is generally perpendicular to the surface of each ledge 460, 462.

Therefore, in a similar way as described above for the embodiment for FIGS. 1-11, multiple of the key protrusions on a single wing slide circumferentially into a single (one) circumferential recess portion, rather than each key protrusion having its own circumferential recess, slot, or cammed ramp surface. Thus, in this embodiment, at least one of the circumferential recess portions will contain, when the filter is installed, multiple key protrusions.

Figures 35, 36, 37:
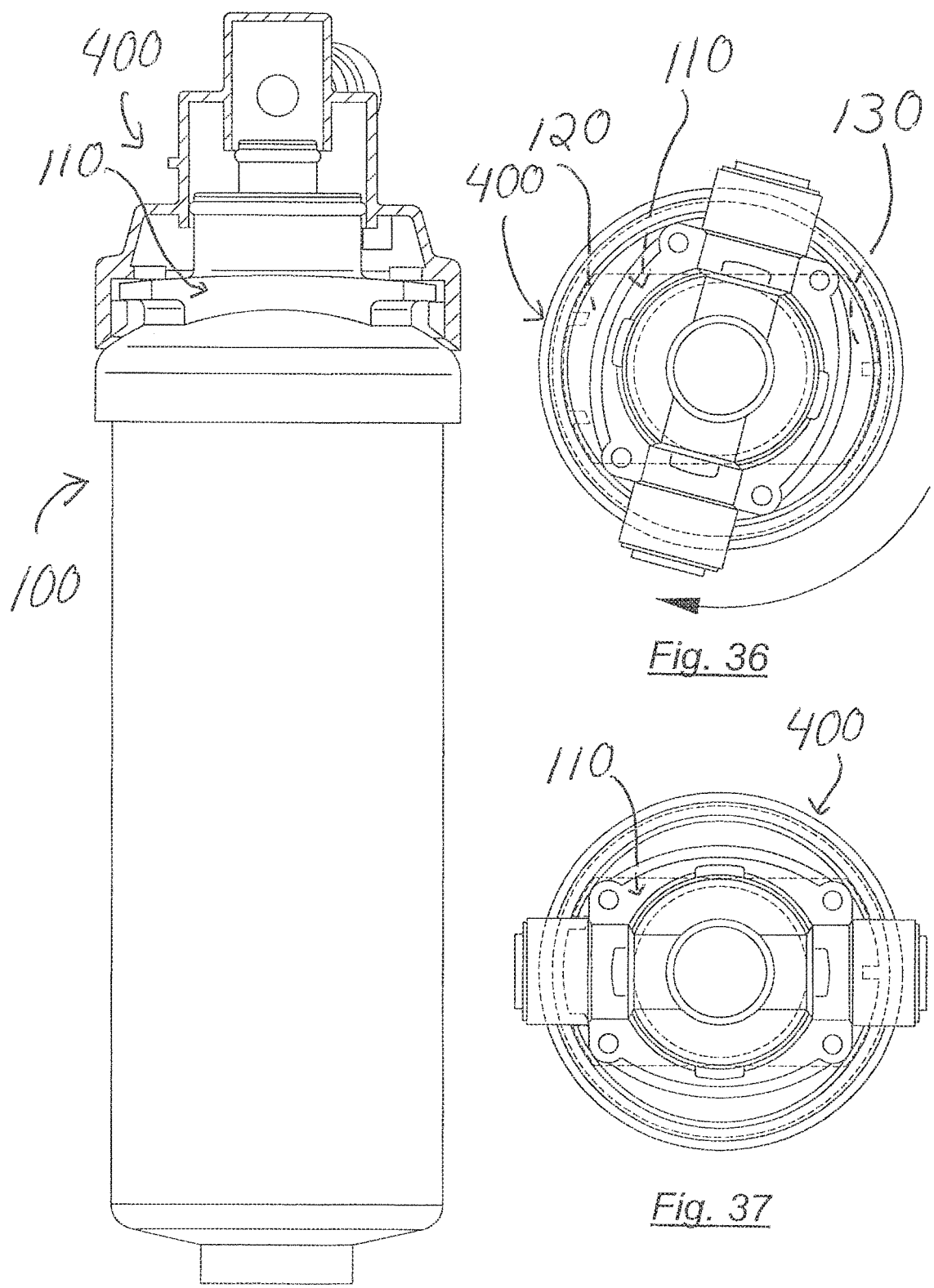

Referring specifically to the top views of the holder and filter assembly in FIGS. 36 and 37, FIG. 36 shows the location of the flange structure 110 in dashed lines when it has been slid up through the axial recesses of the holder, prior to rotation. Upon rotation, the wings 120, 130 slide into their respective circumferential recesses portions 440, 450, which means that at least a plurality (and preferably all) of the multiple key protrusions 126 of wing 120 slide into a single circumferential recess portion 440, and that at least a plurality (and preferably all) of the multiple key protrusions 136 of wing 130 slide into a single circumferential recess portion 450. In other words, preferably all of the keyed protrusions of each set slide into their respective single circumferential recess portion or "respective slot."

Figure 40:
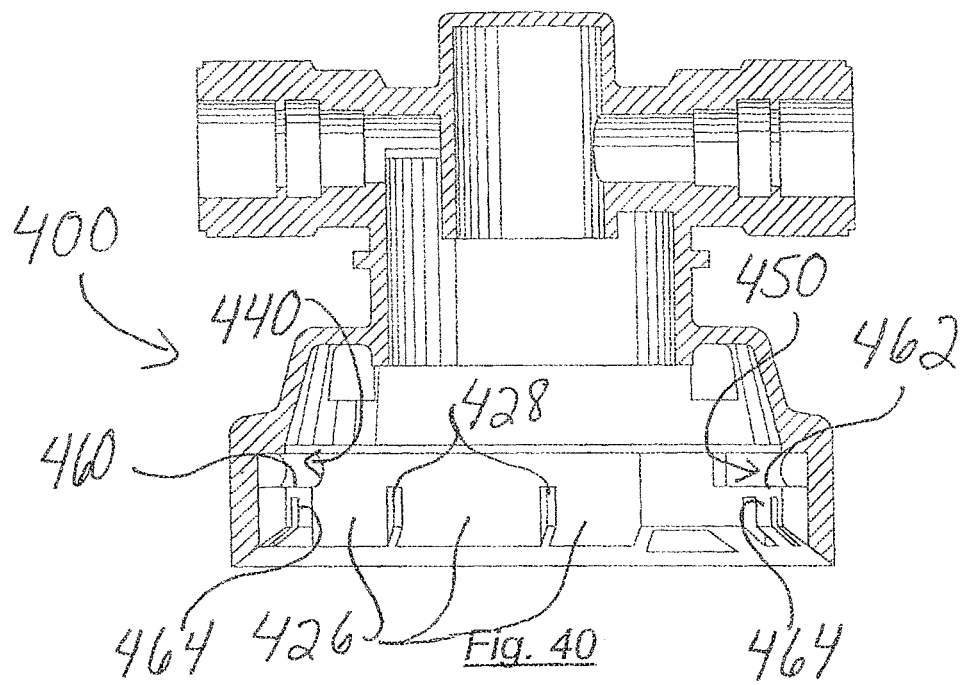
Figure 44:
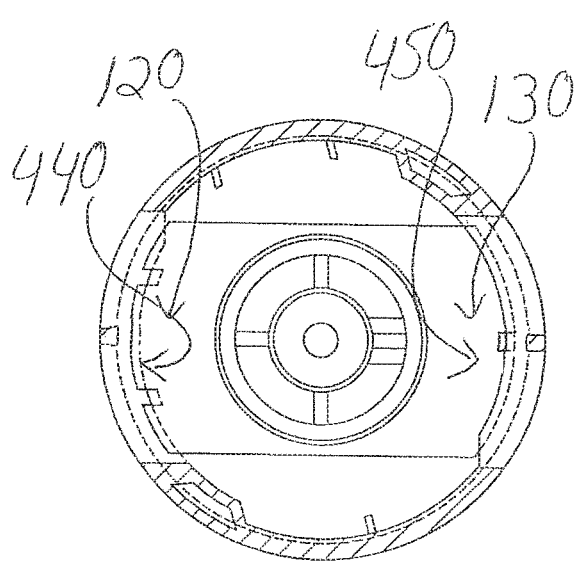
Figure 45:
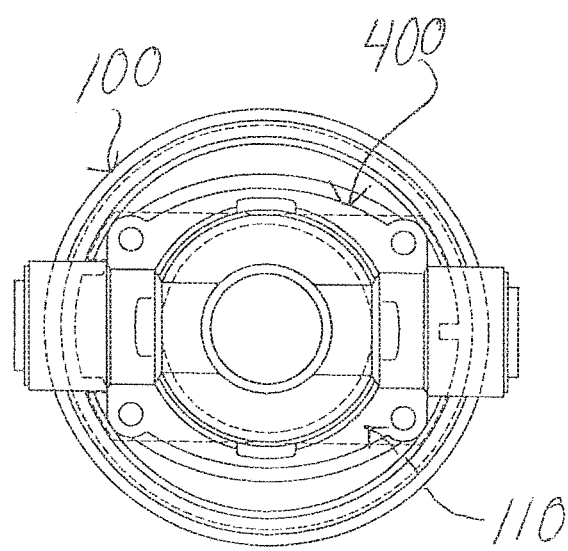
FIG. 45 is a top view of the entire holder and filter, with the filter flanges in dashed lines captured in the two diametrically-opposed circumferential recess portions as in FIG. 44.

Referring to FIGS. 39-43, there is shown to best advantage the recess structures 420, 430 that comprise axial recesses 426, 436 (see FIG. 39) and respective circumferential recess portions 440 and 450 having ledges 460, 462 (see FIG. 40). By referring to the cross-sectional views in FIG. 41-43, one may understand how axial recesses 426, 436 allow the key protrusions 126, 136 of the wings 120, 130 to pass beyond the partition ridges 428, 429 (see FIG. 42), and then, upon rotation of the filter, the key protrusions will slide over ledges 460, 462 of the circumferential recess portions 440, 450 to be retained in the holder by said ledges 460, 462 (see FIG. 43 where the holder has been rotated relative to the filter). FIG. 44 is a top view of the entire holder with the filter shown in dashed lines inserted and locked into the holder as in FIG. 43.

In view of the above disclosure, it may be noted that important, but not all embodiments, of the invented keyed system may be described as a keyed system for filters and their holders, the keyed system comprising, consisting essentially of, or consisting of:

a filter and a cooperating holder;

wherein the filter has a top end comprising a filter surface with a perimeter and at least one protrusion structure on said perimeter;

wherein the filter holder has a holder surface with a perimeter having at least one cooperating recess structure, wherein the locations of said at least one protrusion structure and said at least one recess structure are selectively locateable to different circumferential locations on said perimeters to prevent said filter from being installed in any but its cooperative holder;

wherein said at least one cooperating recess structure includes a first recess structure comprising a plurality of axial recess portions separated by ridges, and a single circumferentially-extending recess portion having an open end near, and in mechanical communication with, said axial recess portions;

wherein said top end of the filter comprises an axial side wall, an upper generally radial surface, a largest-diameter portion at or near a junction between said axial side wall and said upper radial surface, and a central neck upending from said upper radial surface at a longitudinal axis of the filter;

wherein said at least one protrusion structure is located between said largest-diameter portion and said central neck and comprises a first plurality of key protrusions that slide through a plurality of said axial recess portions of the first recess structure during axial insertion of the filter into the holder and, upon angular rotation of the filter in the holder, said first plurality of key protrusions all being received in said single circumferentially-extending recess portion of the first recess structure to lock the filter in said holder.

The at least one protrusion structure may be located between said largest-diameter portion and said central neck by means of said perimeter of the filter surface having a perimeter-diameter, said largest-diameter portion having a portion-diameter, and said central neck having an outer wall with an outer-neck-diameter, and said perimeter-diameter being intermediate in size between said portion-diameter and said outer-neck-diameter. The largest-diameter portion may be a radial distance from said central neck outer wall and said first plurality of key protrusions may be located at a radial distance from the central neck outer wall that is greater than 50 percent of said radial distance between said central neck outer wall and said largest-diameter portion. The first plurality of key protrusions may be located within an arc of 90 degrees or less on said perimeter of the filter surface. Said first plurality of key protrusions of the first flange may be located within an arc of 70 degrees or less on said perimeter of the filter surface. Said at least one protrusion structure may further comprise a second plurality of key protrusions and the at least one recess structure may further comprise a second recess structure, wherein the locations of said second plurality of key protrusions and the second recess structure may be selectively locateable to different circumferential locations on said perimeters to prevent said filter from being installed in any but its cooperative holder; wherein the second recess structure may comprise a plurality of axial recess portions separated by ridges, and the second recess structure further may comprise a single circumferentially-extending recess portion having an open end near, and in mechanical communication with, the axial portions of the second recess structure; wherein said second plurality of key protrusions-slide may through a plurality of said axial recess portions of the second recess structure during axial insertion of the filter into the holder, and, upon angular rotation of the filter in the holder, said second plurality of key protrusions may be received in the single circumferentially-extending recess portion of the second recess structure; and said second plurality of key protrusions may be located at a radial distance from the central neck that is greater than 50 percent of the radial distance between said central neck and said largest-diameter portion of the top end. Said first plurality of protrusions and said second plurality of protrusions may extend radially away from said longitudinal axis 180 degrees from each other. Said first plurality of key protrusions may be located within an arc of 90 degrees or less on said perimeter of the filter surface, and wherein said second plurality of key protrusions may be within an arc of 90 degrees or less on said perimeter of the filter surface and generally diametrically opposite of said first plurality of protrusions. Said first plurality of key protrusions may be located within an arc of 70 degrees or less on said perimeter of the filter surface, and wherein said second plurality of key protrusions may be within an arc of 70 degrees or less on said perimeter of the filter surface and generally diametrically opposite of said first plurality of protrusions. Said first plurality of key protrusions may have a circumferential length, and the single circumferentially-extending recess portion of the first recess structure may have a circumferential length at least as long as the circumferential length of the first plurality of key protrusions may have a circumferential length, and the single circumferentially-extending recess portion of the first recess structure may have a circumferential length at least as long as the circumferential length of the first plurality of key protrusions; and wherein said second plurality of key protrusions may have a circumferential length and the single circumferentially-extending recess portion of the second recess structure may have a circumferential length at least as long as the circumferential length of the second plurality of key protrusions. Said single circumferentially-extending recess portion of the first recess structure may further have a rotational stop adapted to limit rotation of the filter at an end opposite of said open end. Said single circumferentially-extending recess portion of the first recess structure may have a first rotational stop adapted to limit rotation of the filter at an end opposite said open end; and wherein said single circumferentially-extending recess portion of the second recess structure may further have a second rotational stop adapted to limit rotation of the filter. Said filter surface further may comprise one or more additional key protrusions, and said holder surface may further comprise one or more additional axial recess portions in mechanical communication with said single circumferentially-extending recess portion, wherein said one or more additional key protrusions may slide through said additional axial recess portions during said axial insertion of the filter into the holder, and wherein said circumferential recess portion may be of such a circumferential length that, upon angular rotation of the filter in the holder, at least some of said additional key protrusions are not received in said circumferential recess portion. The number and circumferential length of the first plurality of key protrusions may be selected to mate with said plurality of axial recess portions of the first recess structure, so that the filter is prevented from being installed in any but its cooperative holder. The number and circumferential length of the second plurality of key protrusions may be selected to mate with said plurality of axial recess portions of the second recess structure, so that the filter is prevented from being installed in any but its cooperative holder.

In view of the above disclosure, it may be noted that important, but not all embodiments, of the invented keyed system may be described as a keyed system for filters and their holders, the keyed system comprising, consisting essentially of, or consisting of:

a keyed system for filters and their holders, the keyed system comprising:

a filter and a cooperating holder;

wherein the filter has a top end comprising an upper generally radial surface, an axial side wall, a shoulder at or near a junction of said upper generally radial surface and the axial sidewall, a central neck upending from the upper generally radial surface at a longitudinal axis of the filter, and at least one protrusion structure extending from said top end between the shoulder and the central neck;

wherein the filter holder has an internal surface comprising at least one cooperating recess structure, wherein the locations of said at least one protrusion structure and said at least one recess structure are selectively locateable to different circumferential locations on said top end of the filter and in said internal surface, respectively, to prevent said filter from being installed in any but its cooperative holder;

wherein said at least one cooperating recess structure includes a first recess structure comprising a plurality of axial recess portions separated by ridges, and a single circumferentially-extending recess portion having an open end near, and in mechanical communication with, said axial recess portions;

wherein said at least one protrusion structure comprises a first plurality of key protrusions that slide through a plurality of said axial recess portions of the first recess structure during axial insertion of the filter into the holder and, upon angular rotation of the filter in the holder, said first plurality of key protrusions all being received in said single circumferentially-extending recess portion of the first recess structure to lock the filter in said holder. At least one protrusion structure may be located between said shoulder and said central neck by means of said at least one protrusion structure having an outer diameter, said shoulder having a shoulder-diameter, and said central neck having an outer wall with an outer-neck-diameter, and said outer diameter being intermediate in size between said shoulder-diameter and said outer-neck-diameter. Said shoulder may be a radial distance from said central neck outer wall and said first plurality of key protrusions may be located at a radial distance from the central neck outer wall that is greater than 50 percent of said radial distance between said central neck outer wall and said shoulder. Said first plurality of key protrusions may all be positioned on an arc of 90 degrees or less on said top end of the filter. Said first plurality of key protrusions may all be positioned on an arc of 70 degrees or less on said top end of the filter.

As described above for the embodiment of FIGS. 1-11, not all of the key protrusions of a given protrusion structure need to be received in the circumferentially-extending recess portion of the respective recess structure in the holder. For example, multiple key protrusions of the first flange may slide into said circumferential recess portion, but there may be additional key protrusions on the first flange that do not fit into the circumferential recess portion. It is preferred that most or all fit into the circumferential recess portion, but there may be additional key protrusions that slide through their own respective axial recess portions but do not enter the circumferential recess portion and therefore, overhang the axial recess portions. In other words, for any given cooperating protrusion structure and recess structure, the keyed protrusion structure (or keyed filter surface) may further comprise one or more additional key protrusions, and said recess structure (or keyed holder surface) may further comprise one or more additional axial recess portions in mechanical communication with said single circumferentially-extending recess portion, wherein said one or more additional key protrusions slide through said additional axial recess portions during said axial insertion of the filter into the holder, and wherein said circumferential recess portion is of such a circumferential length that, upon angular rotation of the filter in the holder, at least some of said additional key protrusions are not received in said circumferential recess portion.

Although this invention has been described above with reference to particular means, materials and embodiments, it is to be understood that the invention is not limited to these disclosed particulars, but extends instead to all equivalents within the broad scope of the following claims.

The invention claimed is:

1. A filter keying system comprising:
a filter comprising an axial side wall, an upper generally radial surface, a junction between the axial side wall and said upper radial surface, and a central neck upending from said upper radial surface at a longitudinal axis of the filter and having a central neck outer wall with an outer-neck-diameter, the filter further comprising a filter surface with a perimeter comprising at least one protrusion structure that is located between said junction and said central neck;
a filter holder having a holder surface with a perimeter having at least one cooperating recess structure, wherein said at least one cooperating recess structure includes a first recess structure comprising a plurality of axial recess portions separated by partition ridges that protrude radially between said axial recess portions, and a single circumferentially-extending recess portion having an open end near, and in mechanical communication with, said axial recess portions;
wherein said at least one protrusion structure comprises a first plurality of key protrusions that slide through a plurality of said axial recess portions of the first recess structure during axial insertion of the filter into the holder by sliding axially past said partition ridges, and, upon angular rotation of the filter in the holder, said first plurality of key protrusions all being received in said single circumferentially-extending recess portion of the first recess structure to lock the filter in said holder.

2. The keying system of claim 1, wherein said at least one protrusion structure is located between said junction and said central neck by means of said perimeter of the filter surface having a perimeter-diameter, said junction having a largest-diameter portion and said perimeter-diameter being intermediate in size between said largest-diameter portion and said outer-neck-diameter.

3. The keying system of claim 2, wherein said largest-diameter portion is a radial distance from said central neck outer wall and said first plurality of key protrusions are located at a radial distance from the central neck outer wall that is greater than 50 percent of said radial distance between said central neck outer wall and said largest-diameter portion.

4. The keying system of claim 1, wherein said first plurality of key protrusions are located within an arc of 90 degrees or less on said perimeter of the filter surface.

5. The keying system of claim 1, wherein said first plurality of key protrusions of the first flange are located within an arc of 70 degrees or less on said perimeter of the filter surface.

6. The keying system of claim 1, wherein said at least one protrusion structure further comprises a second plurality of key protrusions and the at least one recess structure further comprises a second recess structure;
wherein the second recess structure comprises a plurality of axial recess portions separated by partition ridges that protrude radially between said axial recess portions of the second recess structure, and the second recess structure further comprises a single circumferentially-extending recess portion having an open end near, and in mechanical communication with, the axial portions of the second recess structure;
wherein said second plurality of key protrusions-slide through a plurality of said axial recess portions of the second recess structure during axial insertion of the filter into the holder by sliding axially past said partition ridges of the second recess structure, and, upon angular rotation of the filter in the holder, said second plurality of key protrusions are received in the single circumferentially-extending recess portion of the second recess structure;
wherein said junction comprises a largest-diameter portion that is a radial distance from said central neck outer wall and said second plurality of key protrusions is located at a radial distance from the central neck that is greater than 50 percent of the radial distance between said largest-diameter portion and said central neck.

7. The keying system as in claim 6, wherein said first plurality of protrusions and said second plurality of protrusions extend radially away from said longitudinal axis 180 degrees from each other.

8. The keying system as in claim 7, wherein said first plurality of key protrusions are located within an arc of 90 degrees or less on said perimeter of the filter surface, and wherein said second plurality of key protrusions are within an arc of 90 degrees or less on said perimeter of the filter surface and generally diametrically opposite of said first plurality of protrusions.

9. The keying system as in claim 7, wherein said first plurality of key protrusions are located within an arc of 70 degrees or less on said perimeter of the filter surface, and wherein said second plurality of key protrusions are within an arc of 70 degrees or less on said perimeter of the filter surface and generally diametrically opposite of said first plurality of protrusions.

10. The keying system as in claim 1, wherein said first plurality of key protrusions has a circumferential length, and the single circumferentially-extending recess portion of the first recess structure has a circumferential length at least as long as the circumferential length of the first plurality of key protrusions.

11. The keying system as in claim 6, wherein said first plurality of key protrusions has a circumferential length, and the single circumferentially-extending recess portion of the first recess structure has a circumferential length at least as long as the circumferential length of the first plurality of key protrusions; and wherein said second plurality of key protrusions has a circumferential length and the single circumferentially-extending recess portion of the second recess structure has a circumferential length at least as long as the circumferential length of the second plurality of key protrusions.

12. The keying system as in claim 1, wherein said single circumferentially-extending recess portion of the first recess structure further has a rotational stop adapted to limit rotation of the filter at an end opposite of said open end.

13. The keying system as in claim 6, wherein said single circumferentially-extending recess portion of the first recess structure has a first rotational stop adapted to limit rotation of the filter at an end opposite said open end; and wherein said single circumferentially-extending recess portion of the second recess structure further has a second rotational stop adapted to limit rotation of the filter.

14. The keying system of claim 1, wherein said filter surface further comprises one or more additional key protrusions, and said holder surface further comprises one or more additional axial recess portions in mechanical communication with said single circumferentially-extending recess portion, wherein said one or more additional key protrusions slide through said additional axial recess portions during said axial insertion of the filter into the holder, and wherein said circumferential recess portion is of such a circumferential length that, upon angular rotation of the filter in the holder, at least some of said additional key protrusions are not received in said circumferential recess portion.

15. The keyed system of claim 10, wherein number and circumferential length of the first plurality of key protrusions are selected to mate with said plurality of axial recess portions of the first recess structure, so that the filter is prevented from being installed in any but said cooperating holder.

16. The keyed system of claim 11, wherein number and circumferential length of the second plurality of key protrusions are selected to mate with said plurality of axial recess portions of the second recess structure, so that the filter is prevented from being installed in any but said cooperating-holder.

17. A method of installing a keyed filter in a cooperating filter holder, the method comprising:
providing a filter with a top end comprising an upper generally radial surface, an axial side wall, a shoulder at or near a junction of said upper generally radial surface and the axial sidewall, a central neck upending from the upper generally radial surface at a longitudinal axis of the filter and having a central neck outer wall with an outer-neck-diameter, and at least one protrusion structure extending from said top end between the shoulder and the central neck, wherein said at least one protrusion structure comprises a first plurality of key protrusions;
providing a filter holder that has an internal surface comprising at least one cooperating recess structure, wherein said at least one cooperating recess structure includes a first recess structure comprising a plurality of axial recess portions separated by partition ridges that protrude radially between said axial recess portions, and a single circumferentially-extending recess portion having an open end near, and in mechanical communication with, said axial recess portions; and
the method further comprising axially inserting the filter top end into the filter holder so that said first plurality of key protrusions slide through a plurality of said axial recess portions of the first recess structure by sliding axially past said partition ridges, and then angularly rotating the filter in the holder to place all of said first plurality of key protrusions in said single circumferentially-extending recess portion of the first recess structure to lock the filter in said holder.

18. The method of claim 17, wherein said at least one protrusion structure is located between said shoulder and said central neck by means of said at least one protrusion structure having an outer diameter, said shoulder having a shoulder-diameter, and said outer diameter being intermediate in size between said shoulder-diameter and said outer-neck-diameter.

19. The method of claim 17, wherein said shoulder is a radial distance from said central neck outer wall and said first plurality of key protrusions are located at a radial distance from the central neck outer wall that is greater than 50 percent of said radial distance between said central neck outer wall and said shoulder.

20. The method of claim 17, wherein said first plurality of key protrusions are all positioned on an arc of 90 degrees or less on said top end of the filter.

21. The method of claim 17, wherein said first plurality of key protrusions are all positioned on an arc of 70 degrees or less on said top end of the filter.

* * * * *